US008545138B2

(12) United States Patent
Wilkins

(10) Patent No.: US 8,545,138 B2
(45) Date of Patent: Oct. 1, 2013

(54) MACHINES FOR BORING AXIALLY-ALIGNED SURFACES AND RELATED METHODS

(76) Inventor: Larry C. Wilkins, Ft. Lauderdale, FL (US)

( * ) Notice: Subject to any disclaimer, the term of this patent is extended or adjusted under 35 U.S.C. 154(b) by 1153 days.

(21) Appl. No.: 12/479,370

(22) Filed: Jun. 5, 2009

(65) Prior Publication Data
US 2010/0310328 A1 Dec. 9, 2010

(51) Int. Cl.
*B23B 41/12* (2006.01)
(52) U.S. Cl.
USPC ...... 408/2; 408/54; 408/75; 408/88; 408/234; 408/708
(58) Field of Classification Search
USPC .................. 408/54, 2, 13, 75, 87–88, 115 R, 408/234, 236–237, 707–708; 33/630, 632, 33/638, 641–642; 82/113
IPC ........................................................ B23B 41/12
See application file for complete search history.

(56) References Cited

U.S. PATENT DOCUMENTS

| | | | | |
|---|---|---|---|---|
| 1,382,842 A | * | 6/1921 | Martell | ............................ 408/75 |
| 1,939,786 A | | 12/1933 | Mooers | |
| 1,953,402 A | * | 4/1934 | Graham | ............................ 408/21 |
| 2,170,054 A | * | 8/1939 | Jeschor | ........................... 408/111 |
| 2,632,341 A | * | 3/1953 | Arp | ................................. 408/11 |
| 2,651,221 A | | 9/1953 | Foster | |
| 3,782,847 A | | 1/1974 | Kulzer | |
| 4,451,186 A | | 5/1984 | Payne | |
| RE31,859 E | | 4/1985 | Aldridge, Jr. | |
| 4,693,642 A | | 9/1987 | Mair et al. | |
| 4,730,958 A | | 3/1988 | Banoczky | |
| 4,850,756 A | | 7/1989 | Dubois | |
| 4,979,850 A | | 12/1990 | Dompé | |
| 4,990,037 A | * | 2/1991 | Strait | .......................... 408/72 R |
| 5,183,365 A | * | 2/1993 | Silk | ................................. 408/80 |
| 5,628,591 A | | 5/1997 | Gamble | |
| 5,741,096 A | | 4/1998 | Olds | |
| 5,836,725 A | | 11/1998 | Harmand | |
| 6,287,057 B1 | | 9/2001 | Kurz | |
| 6,447,220 B1 | * | 9/2002 | Ricci et al. | .................. 408/72 R |
| 6,554,549 B1 | | 4/2003 | Kurz | |
| 7,220,085 B2 | * | 5/2007 | Nader et al. | ................... 408/1 R |

FOREIGN PATENT DOCUMENTS

DE 821580 A * 11/1951

OTHER PUBLICATIONS

EPO website machine translation of DE 821580, printed Jan. 2013.*

* cited by examiner

*Primary Examiner* — Daniel Howell
(74) *Attorney, Agent, or Firm* — Finnegan, Henderson, Farabow, Garrett & Dunner, L.L.P.

(57) ABSTRACT

A machine for boring spaced, axially-aligned surfaces of a part includes a frame and a boring apparatus associated with the frame. The boring apparatus is configured to bore at least one surface of the part and includes a boring bar associated with a cutting tool configured to rotate about a longitudinal axis of the boring bar. The machine further includes a mounting fixture associated with the frame configured to mount the part in a fixed relationship with respect to the frame. The machine also includes an alignment assembly including at least one pair of plates. At least one of the plates of the pair of plates is configured to pivot such that the longitudinal axis of the boring bar is aligned with an axis defined by the axially-aligned surfaces of the part.

49 Claims, 19 Drawing Sheets

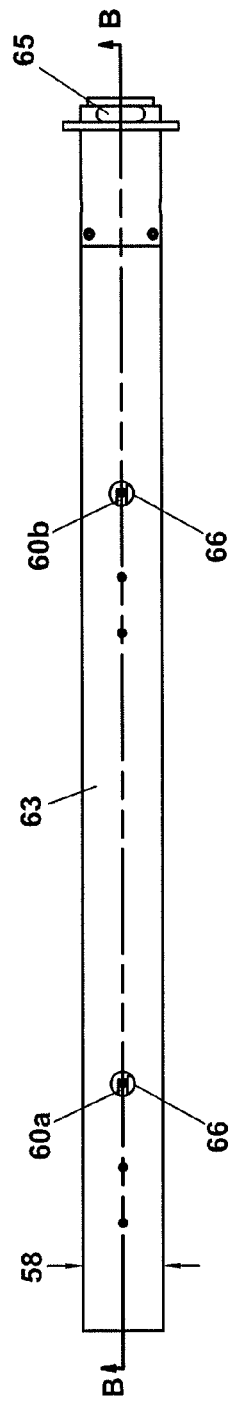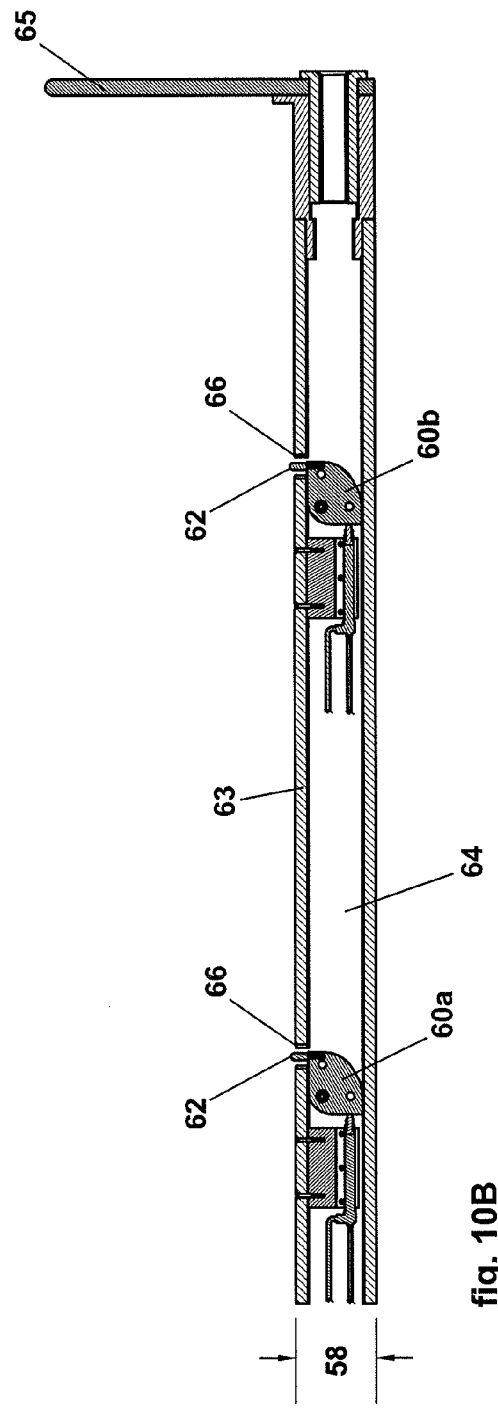

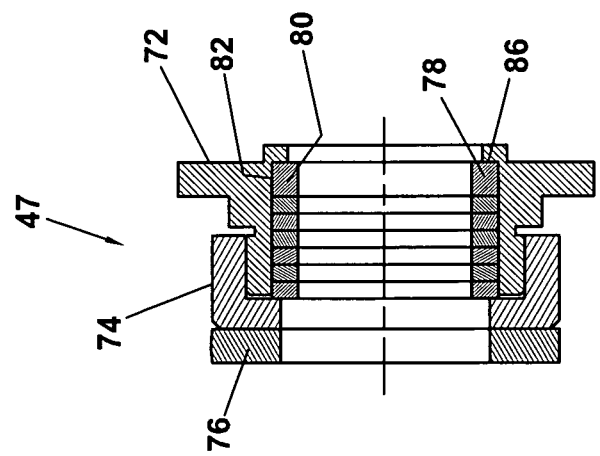
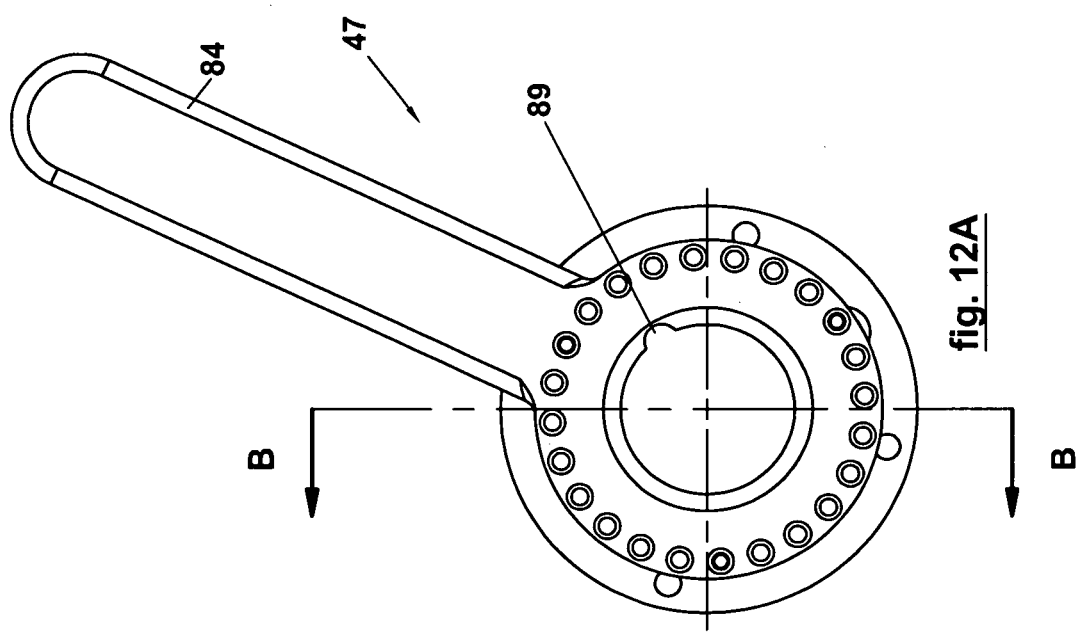
fig. 12B
fig. 12A

MACHINES FOR BORING AXIALLY-ALIGNED SURFACES AND RELATED METHODS

FIELD OF THE DISCLOSURE

The present disclosure relates to a machine for boring surfaces in a part and related methods. In particular, the present disclosure relates to a machine for boring axially-aligned, longitudinally-spaced surfaces in a part and related methods.

BACKGROUND

It may be desirable to machine a surface of a part to achieve a desired surface dimension or characteristic. For example, it may be desirable to machine two circumferential surfaces (or portions thereof) that are longitudinally-spaced from one another and that define a common axis extending between the centers of the two surfaces. One example of a situation in which this may be applicable, is the cylinder block of an internal combustion engine. It that example, it may be desirable to machine longitudinally-spaced surfaces that receive bearings on which the crankshaft of the internal combustion engine rotates. In particular, one side of such surfaces may be defined by spaced housings in the cylinder block of the engine, and the opposite side of the surfaces may be defined by bearing caps that are affixed to the engine block opposite the spaced housings. Because the cylinder block and the bearing caps define the surfaces, it may be preferred to machine the surfaces with the bearing caps assembled to the cylinder block. Further, in order to avoid development of unnecessary stresses on the crankshaft in an assembled engine during operation, it may be desirable to machine the surfaces in such a manner that the resulting, freshly-machined surfaces are axially-aligned with the surfaces prior to machining, and further, that they are axially-aligned with one another after machining. As a result, it may be desirable to have a boring machine that facilitates boring spaced circumferential surfaces in an aligned manner.

In order to machine the longitudinally-spaced surfaces such that they are axially-aligned after machining, it may be necessary to align the axis defined by the pre-machined surfaces with the axis along which a cutting tool of the boring machine translates. Although various systems and methods have been developed for achieving this alignment, those conventional systems and methods often involve tedious and/or repeated manual adjustments, which may significantly increase the amount of time required to perform the machining process with satisfactory results. Further, some machining processes may involve more than a single machining pass, and some conventional systems and methods may require re-alignment between machining passes, thereby further increasing the amount of time required for machining. Additionally, it may sometimes be desirable to perform the same or similar machining on a number of the same or similar parts. Unfortunately, some conventional systems and methods require re-alignment following the machining of a first part prior to the machining of a second part of the same or similar structure.

Thus, it may be desirable to provide a machine and/or related methods for boring axially-aligned surfaces that reduces the amount of time involved with aligning the axis defined by the pre-machined surfaces with the axis along which a cutting tool of the machine translates. Further, it may be desirable to provide a machine and/or related methods for boring axially-aligned surfaces that permits multiple machining passes of a part without re-alignment. In addition, it may be desirable to provide a machine and/or related methods for boring axially-aligned surfaces that permits machining of more than one of like or similar parts without re-alignment or without significant re-alignment.

SUMMARY

In the following description, certain aspects and embodiments will become evident. It should be understood that the aspects and embodiments, in their broadest sense, could be practiced without having one or more features of these aspects and embodiments. Thus, it should be understood that these aspects and embodiments are merely exemplary.

One aspect of the disclosure relates to a machine for boring axially-aligned surfaces of a part, wherein the axially-aligned surfaces are spaced from one another. The machine includes a frame and a boring apparatus associated with the frame. The boring apparatus is configured to bore at least one surface of the part and includes a boring bar associated with a cutting tool configured to rotate about a longitudinal axis of the boring bar. The machine further includes a mounting fixture associated with the frame. The mounting fixture is configured to mount the part in a fixed relationship with respect to the frame. The machine also includes an alignment assembly movably associated with the frame. The alignment assembly is configured to support the boring bar such that the longitudinal axis of the boring bar is aligned with an axis defined by the axially-aligned surfaces of the part. The alignment assembly includes at least one pair of plates, at least one of the plates of the pair of plates being configured to pivot such that the longitudinal axis of the boring bar is aligned with the axis defined by the axially-aligned surfaces of the part.

Another aspect of the disclosure relates to a machine for boring axially-aligned surfaces of a part, wherein the axially-aligned surfaces are spaced from one another. The machine includes a frame and a boring apparatus associated with the frame. The boring apparatus is configured to bore at least one surface of the part and includes a boring bar associated with a cutting tool configured to rotate about a longitudinal axis of the boring bar. The machine further includes a mounting fixture associated with the frame. The mounting fixture is configured to mount the part in a fixed relationship with respect to the frame. The machine also includes an alignment assembly moveably associated with the frame. The alignment assembly is configured to support the boring bar such that the longitudinal axis of the boring bar is aligned with an axis defined by the axially-aligned surfaces of the part. The alignment assembly includes at least one pair of plates and at least one adjustment screw configured to move at least one of the plates such that the longitudinal axis of the boring bar is aligned with an axis defined by the axially-aligned surfaces of the part.

A further aspect of the disclosure relates to a machine for boring axially-aligned surfaces of a part, wherein the axially-aligned surfaces are spaced from one another. The machine includes a frame and a boring apparatus associated with the frame. The boring apparatus is configured to bore at least one surface of the part and includes a boring bar associated with a cutting tool configured to rotate about a longitudinal axis of the boring bar. The machine further includes a mounting fixture associated with the frame. The mounting fixture is configured to mount the part in a fixed relationship with respect to the frame. The machine also includes an alignment assembly movably associated with the frame. The alignment assembly includes at least two spaced supports configured to support the boring bar such that the longitudinal axis of the boring bar is aligned with an axis defined by the axially-aligned surfaces of the part. The alignment assembly further includes a bearing received by each of the supports. The bearings are configured to rotatably support the boring bar and provide an adjustable support surface defining an axis aligned with the longitudinal axis of the boring bar.

Yet another aspect of the disclosure relates to a machine for boring axially-aligned surfaces of a part, wherein the axially-aligned surfaces are spaced from one another. The machine includes a frame and a boring apparatus associated with the frame. The boring apparatus is configured to bore at least one surface of the part. The boring apparatus includes a boring bar associated with a cutting tool configured to rotate about a longitudinal axis of the boring bar. The machine further includes a mounting fixture associated with the frame and configured to mount the part in a fixed relationship with respect to the frame. The machine also includes an alignment assembly movably associated with the frame. The alignment assembly includes at least two spaced supports configured to rotatably support the boring bar such that the longitudinal axis of the boring bar is aligned with an axis defined by the axially-aligned surfaces of the part. The machine further includes at least one indicator configured to provide an output indicative of a degree of alignment between the longitudinal axis defined by the boring bar and the axis defined by the axially-aligned surfaces of the part.

Still a further aspect of the disclosure relates to an alignment bar configured to facilitate positioning of spaced supports that receive a boring bar for boring spaced, axially-aligned surfaces of a part. The alignment bar includes a shaft configured to have a diameter corresponding to a diameter of the boring bar. The shaft defines a longitudinal axis of the alignment bar and a length sufficient to extend between the spaced supports. The alignment bar further includes a first transducer associated with the shaft. The first transducer is configured to provide a first signal indicative of a distance between the longitudinal axis of the alignment bar and a first one of the spaced, axially-aligned surfaces. The alignment bar also includes a second transducer associated with the shaft and spaced from the first transducer. The second transducer is configured to provide a second signal indicative of a distance between the longitudinal axis of the alignment bar and a second one of the spaced, axially-aligned surfaces. The alignment bar is configured to be received by the spaced supports such that movement of the alignment bar in the spaced supports results in the first and second transducers providing first and second signals that collectively indicate a degree of alignment between the longitudinal axis of the alignment bar and an axis defined by the spaced axially-aligned surfaces.

A further aspect of the disclosure relates to a method for aligning a boring bar of a boring machine with an axis defined by axially-aligned surfaces of a part, the boring machine being configured to bore at least one of the axially-aligned surfaces. The method includes mounting the part in a fixed manner relative to a frame of the boring machine and inserting an alignment bar into a pair of spaced supports of the boring machine configured to rotatably support the boring bar. The method further includes moving at least one of the supports into a position such that a longitudinal axis of the alignment bar is aligned with the axis defined by the axially-aligned surfaces of the part. The method also includes fixing the position of the at least one support, removing the alignment bar from the spaced supports, and inserting the boring bar into the pair of spaced supports.

Still a further aspect of the disclosure relates to a method for boring at least one axially-aligned surface of a part. The method includes aligning a boring bar of a boring machine with an axis defined by axially-aligned surfaces of the part. The method further includes rotating the boring bar and moving the boring bar longitudinally with respect to boring bar supports such that a cutting tool removes material from at least one of the axially-aligned surfaces of the part.

Yet another aspect of the disclosure relates to a method for boring at least one axially-aligned surface of a second part with a boring machine. The method includes boring at least one axially-aligned surface of a first part. The method further includes withdrawing a boring bar and cutting tool from the first part and spaced boring bar supports and removing the first part from the boring machine. The method further includes mounting the second part in a fixed manner relative to a frame of the boring machine and inserting the boring bar into the pair of spaced supports. The method also includes rotating the boring bar and moving the boring bar longitudinally with respect to the supports such that the cutting tool removes material from at least one of the axially-aligned surfaces of the second part.

Additional objects and advantages of the disclosure will be set forth in part in the description which follows, and in part will be obvious from the description, or may be learned by practice of the disclosed exemplary embodiments.

Aside from the structural and procedural arrangements set forth above, the embodiments could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this description, illustrate several exemplary embodiments and together with the description, serve to explain principles of the embodiments. In the drawings.

FIG. 10A is a schematic side view of an exemplary embodiment of an alignment bar;

FIG. 10B is a schematic section view of the exemplary embodiment shown in FIG. 10A along line B-B;

FIG. 12A is a schematic front view of an exemplary embodiment of a machine bearing;

FIG. 12B is a schematic section view of the exemplary embodiment shown in FIG. 12A along line B-B;

DESCRIPTION OF EXEMPLARY EMBODIMENTS

Figure 1:
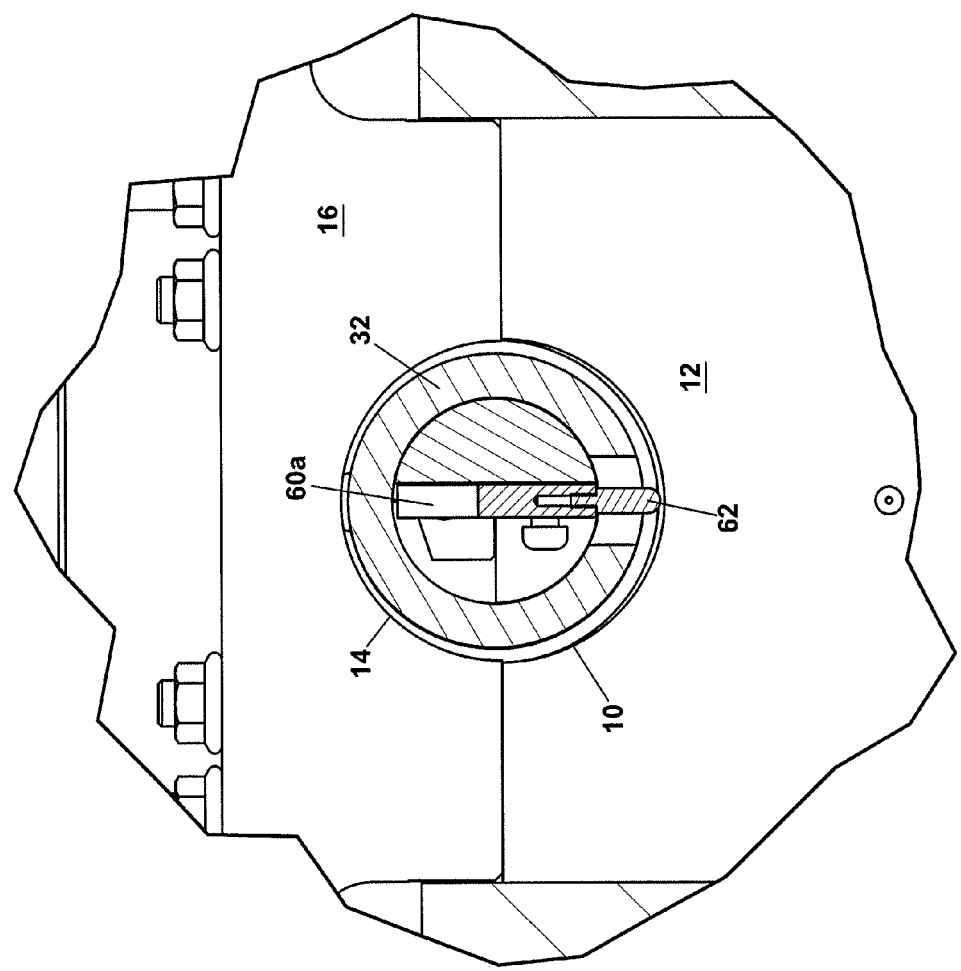
FIG. 1 is a schematic partial section view of exemplary surfaces for machining along with an exemplary embodiment of an alignment bar.

Reference will now be made in detail to exemplary embodiments. Wherever possible, the same reference numbers are used in the drawings and the description to refer to the same or like parts.

It may be desirable to machine a surface of a part to achieve a desired surface dimension or characteristic. For example, it may be desirable to machine two circumferential surfaces (or portions thereof) that are longitudinally-spaced from one another and that define a common axis extending between the centers of the two surfaces. One example of a situation in which this may be applicable relates to the cylinder block of an internal combustion engine. In that example, it may be desirable to machine longitudinally-spaced surfaces that receive the bearings on which the crankshaft of an internal combustion engine rotates.

Referring to FIG. 1, one side of such surfaces 10 is defined by spaced housings in a cylinder block 12 of the engine, and the opposite side of the surfaces 14 is defined by bearing caps 16 that are affixed to the cylinder block 12 opposite the spaced housings. Cylinder block 12 may include a number of longitudinally-spaced pairs of surfaces 10 and 14. Because cylinder block 12 and bearing caps 16 define surfaces 10 and 14, respectively, it is often preferred to machine surfaces 10 and/or 14 with the bearing caps 16 assembled with cylinder block 12. Further, in order to avoid development of unnecessary stresses on the crankshaft (not shown) in an assembled engine during operation, it may be desirable to machine surfaces 10 and/or 14 in such a manner that the resulting, freshly-machined surfaces are axially-aligned with the surfaces prior to machining, and further, that longitudinally-spaced pairs of surfaces 10 and 14 are axially-aligned with one another after machining.

Although aspects of the exemplary embodiments disclosed herein are explained in relation to the machining of parts of an internal combustion engine, it should be understood that the exemplary embodiments described herein could be used to machine one or more surfaces of a part that differs from parts of an internal combustion engine.

Figure 2:
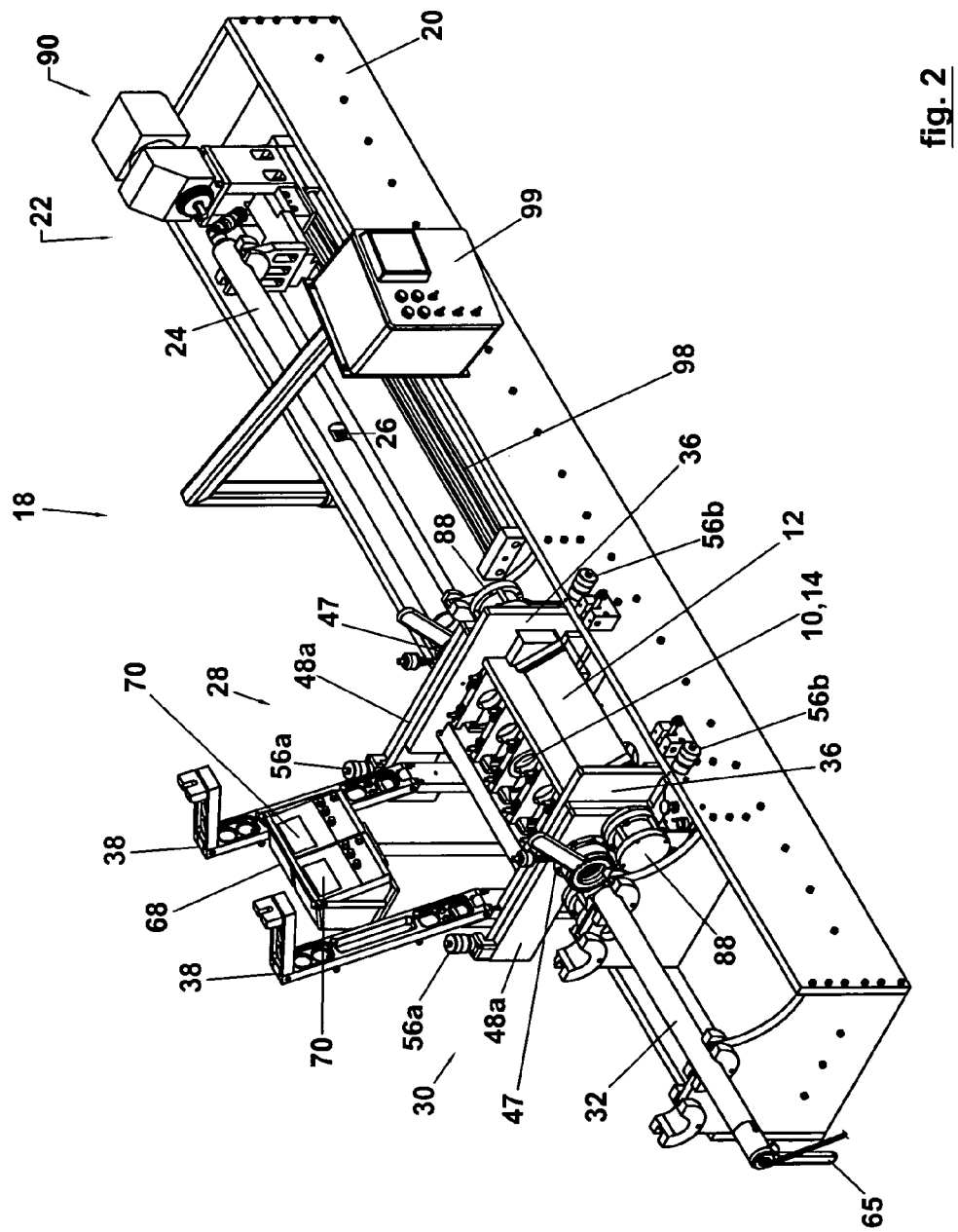
FIG. 2 is a schematic perspective view of an exemplary embodiment of machine for boring surfaces of a part shown in a first mode.

FIG. 2 shows a schematic, perspective view of an exemplary embodiment of a machine 18 for boring longitudinally-spaced circumferential surfaces of a part (or portions thereof) in an axially-aligned manner. Exemplary boring machine 18 includes a main frame 20 supporting a boring apparatus 22, including a boring bar 24 and cutting tool 26, a mounting fixture 28 for supporting the part being machined, and an alignment assembly 30 for aligning the longitudinal axis of boring bar 24 with an axis defined by the centers of longitudinally-spaced pairs of surfaces 10 and 14 to be machined. For the purposes of operation, the part(s) being machined (e.g., cylinder block 12 and/or bearing caps 16) is/are secured within mounting fixture 28, and alignment assembly 30 is used to align boring bar 24's axis and the axis of surfaces 10 and 14 with respect to one another. An alignment bar 32 is used to achieve alignment, and once alignment has been achieved, alignment assembly 30 is locked into position. Thereafter, boring apparatus 22 is moved into position, and the machining of longitudinally-spaced surfaces may be achieved without necessarily realigning boring bar 24 between machining passes.

Figure 3:
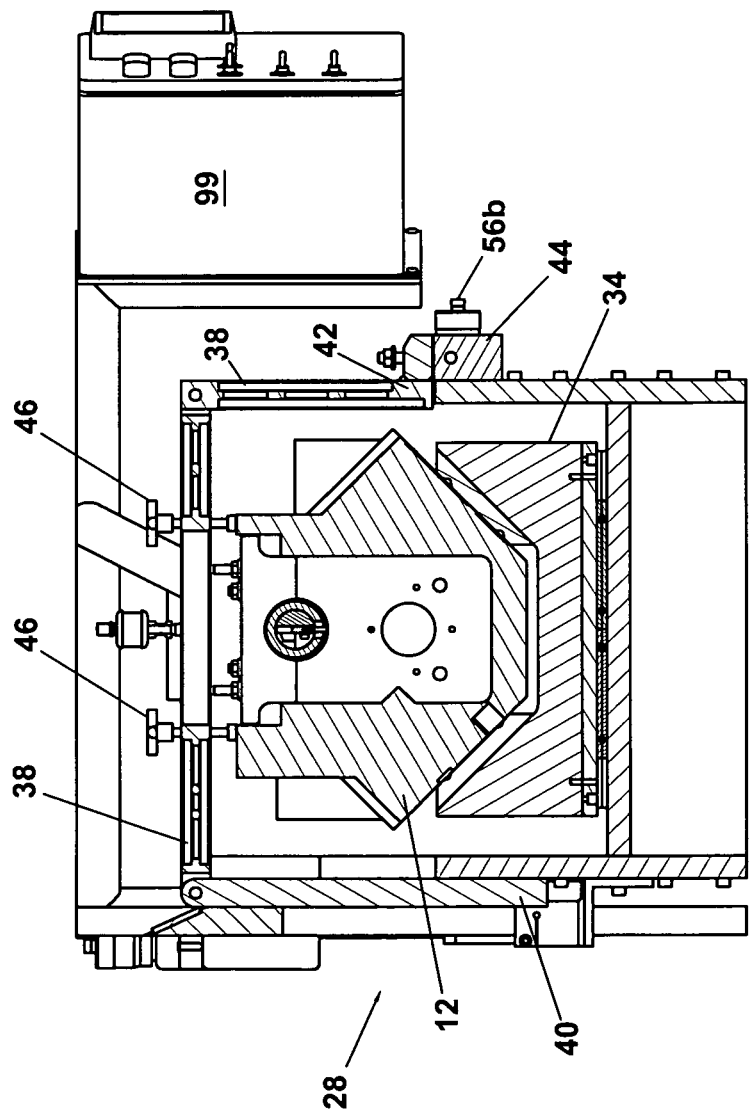
FIG. 3 is a schematic partial section view of a portion of the exemplary embodiment shown in FIG. 2.

Referring to FIG. 3, exemplary mounting fixture 28 is configured to receive a cylinder block 12 of an internal combustion engine, for example, a "V-8" cylinder block 12, in, for example, an inverted orientation. Although exemplary cylinder block 12 has a "V-8" configuration, mounting fixture 28 may be configured to accept other cylinder blocks having other configurations, such as, for example, any of configurations commonly referred to as "flat-four," "flat-six," "boxer," "in-line six," "straight-eight," "V-10," "V-12," "W-12," and "H-16," and may be configured to accept other parts that differ from cylinder blocks of internal combustion engines.

Exemplary mounting fixture 28 includes a support tray 34 on which cylinder block 12 is positioned, a pair of end plates 36 (e.g., fixed end plates), and one or more hold-down clamps 38. Once cylinder block 12 is positioned on support tray 34, opposite ends of cylinder block 12 may be affixed to respective end plates 36, which are immovably coupled to main frame 20 of exemplary machine 18. Hold-down clamps 38 are secured at one end 40 to one side of main frame 20 and are segmented such that they may be folded down across the upward-facing, bottom surface of cylinder block 12 and secured at opposite end 42 to the opposite side of main frame 20 via a fixing assembly 44 (see, e.g., FIG. 4). Hold-down clamps 38 may also include adjustable loading devices 46, such as, for example, lock-down screws, to apply a load to the upward facing surface of cylinder block 12 in order to enhance the force holding cylinder block 12 in position.

Once cylinder block 12 has been mounted in mounting fixture 28, such that the axis defined by the centers of surfaces 10 and/or 14 is oriented in approximate alignment with the longitudinal axis of machine 18, alignment assembly 30 is used to align the axis of boring bar 24 with respect to the axis of the surfaces 10 and 14 to be machined. Exemplary boring apparatus 22 includes boring bar 24 (FIGS. 2, 4, and 13-16) provided with cutting tool 26 (FIG. 15) for cutting (e.g., removing) the material of the surface being machined. Boring bar 24 is configured to be supported by two machine bearings 47 located on opposite sides of respective end plates 36 of mounting fixture 28, such that when positioned for cutting, boring bar 24 rotates on machine bearings 47 located at opposite ends of cylinder block 12 (see, e.g., FIG. 16).

Figure 5:
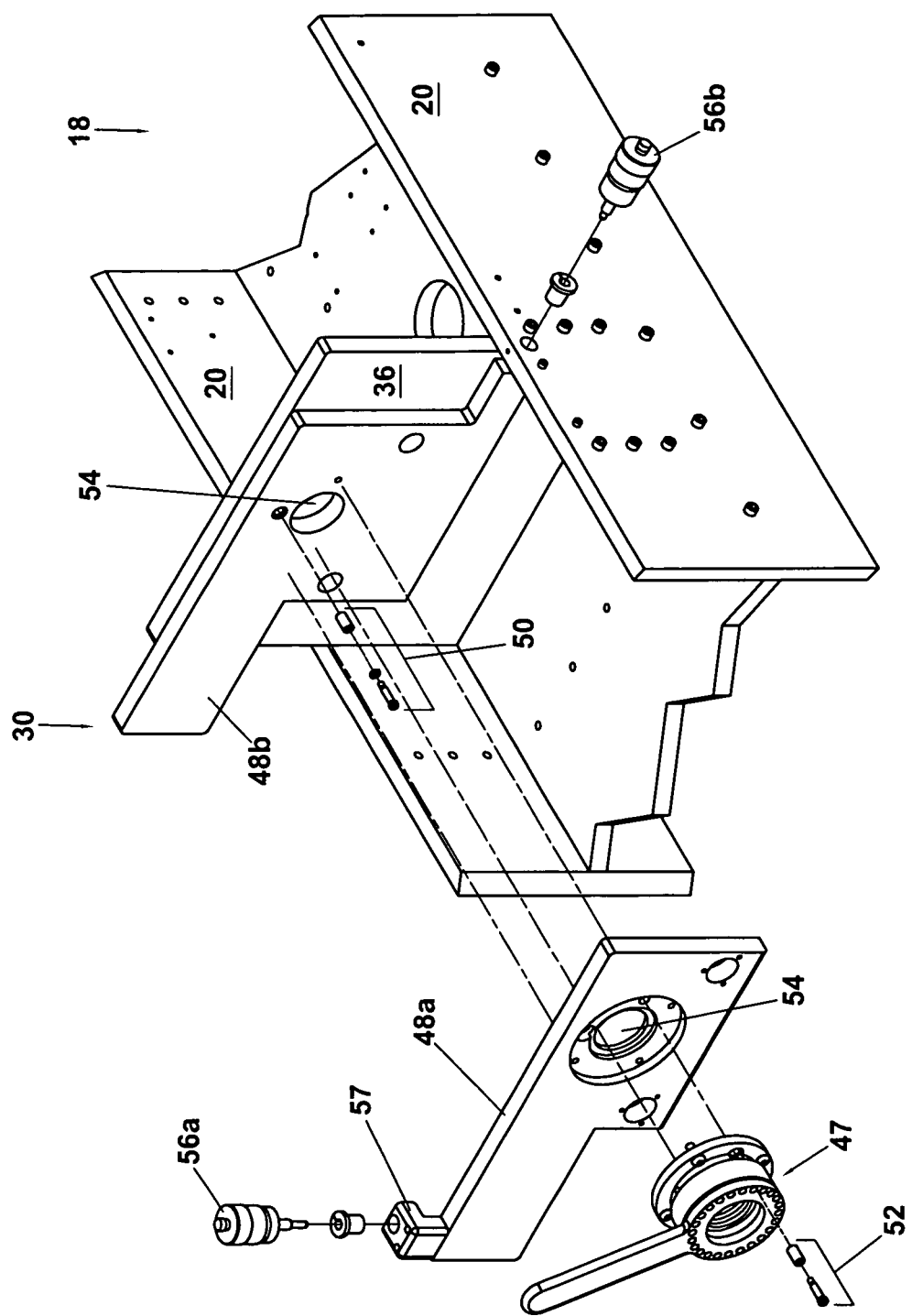
FIG. 5 is a schematic exploded view of a portion of the exemplary embodiment shown in FIG. 2.

According to the exemplary embodiment shown, each of machine bearings 47 is supported by a support, for example, one of a pair of plates—an outboard plate 48a and an inboard plate 48b (see FIGS. 2 and 5). For example, outboard plate 48a, which is located at one end of alignment assembly 30, supports one machine bearing 47, and outboard plate 48a, which is located at the opposite end of alignment assembly 30, supports a second machine bearing 47.

As shown in FIG. 5, exemplary inboard plate 48b is located adjacent to, and is coupled to, end plate 36 of mounting fixture 28. For example, inboard plate 48b is configured to pivot about pin 50 (e.g., a bolt in a sleeve) coupled to end plate 36, such that inboard plate 48b's movement relative to end plate 36 results in moving the associated machine bearing 47 in a substantially horizontal direction via outboard plate 48a. Outboard plate 48a is configured to pivot about pin 52 (e.g., a bolt in a sleeve) coupled to inboard plate 48b, such that outboard plate 48a's movement relative to inboard plate 48b results in moving an associated machine bearing 47 in a substantially vertical direction. Thus, in the exemplary embodiment shown, plates 48a and 48b, which are located at opposite ends of cylinder block 12, provide the ability to move machine bearings 47 to a position, such that when boring bar 24 is positioned in machine bearings 47 for machining, the longitudinal axis of boring bar 24 is aligned with the axis defined by longitudinally-spaced centers defined by surfaces 10 and/or 14.

Figure 6:
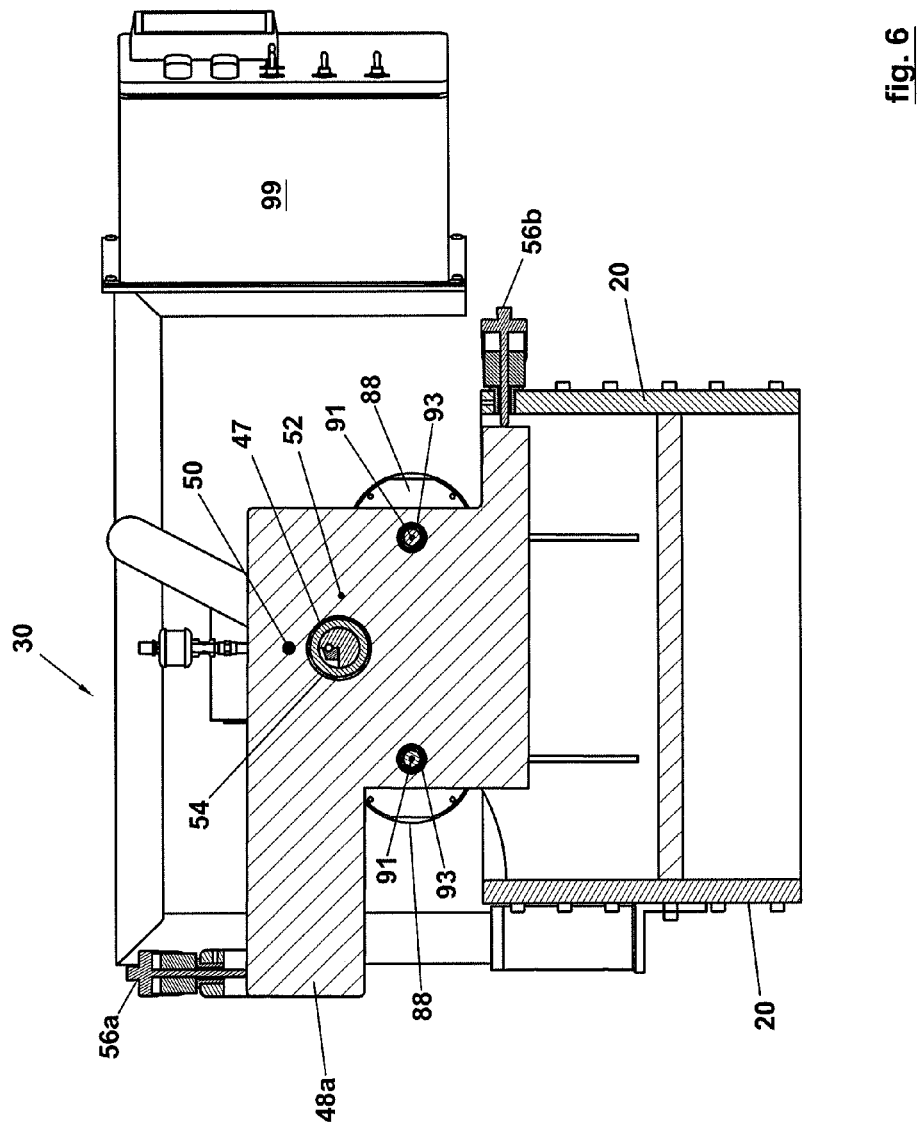
FIG. 6 is a schematic partial section view of a portion of the exemplary embodiment shown in FIG. 2.
Figure 7:
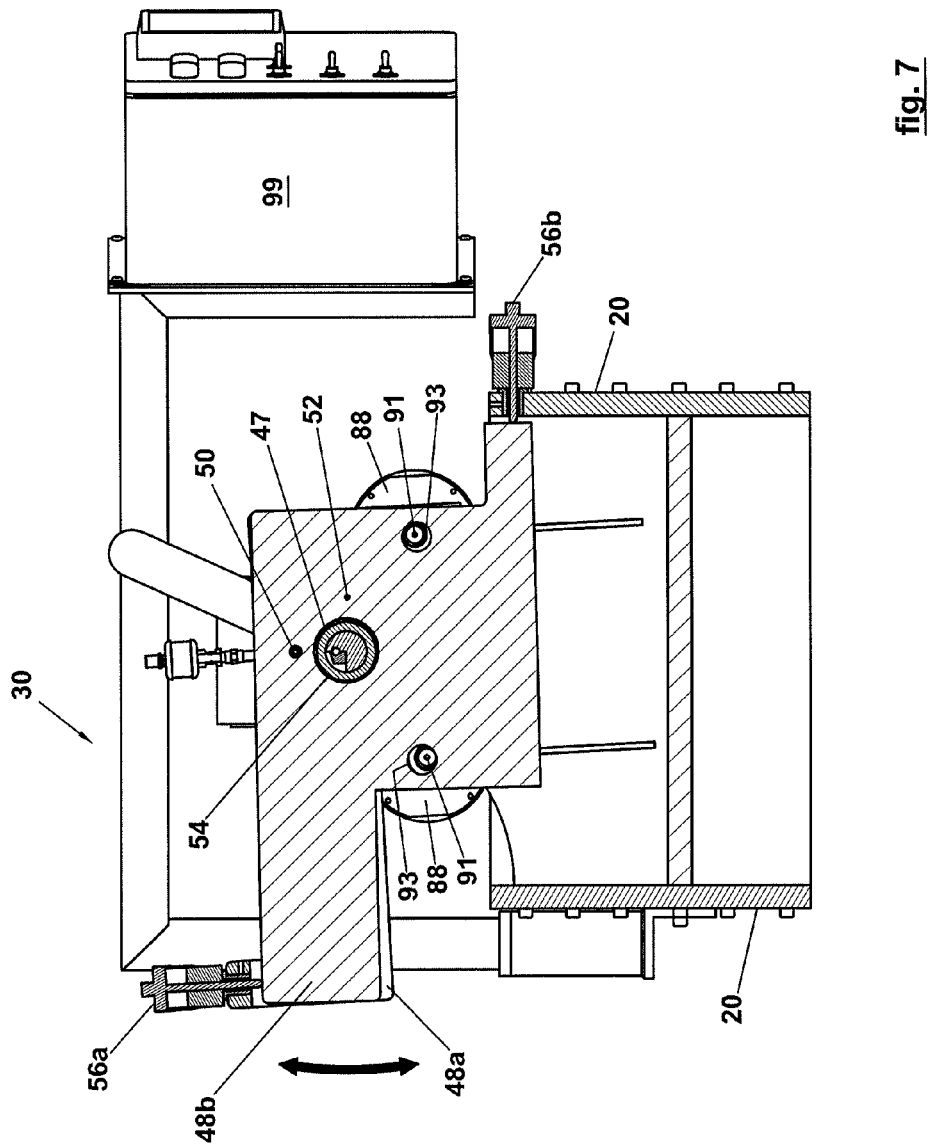
FIG. 7 is a schematic partial section view of the portion of the exemplary embodiment shown in FIG. 6 in a different position.
Figure 8:
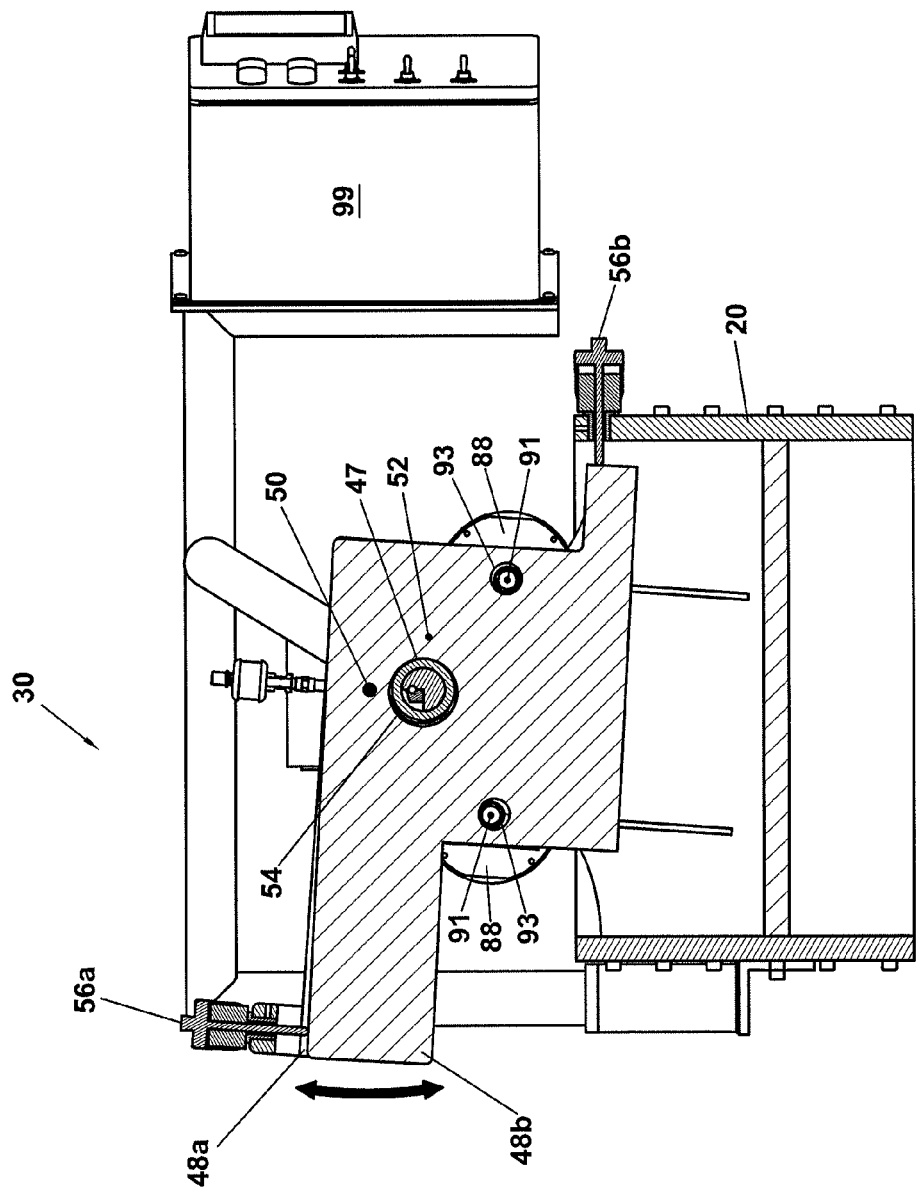
FIG. 8 is a schematic partial section view of the portion of the exemplary embodiment shown in FIG. 6 in yet another position.

For example, referring to FIGS. 6-8, each of plates 48a and 48b pivots on a single axis. Inboard plate 48b is pivotally associated with one end plate 36 of mounting fixture 28 via pin 50, such that inboard plate 48b may pivot about pin 50. Outboard plate 48a is pivotally associated with inboard plate 48b by pin 52, such that outboard plate 48a may pivot about pin 52. Thus, as inboard plate 48b pivots about pin 50, pin 52, which associates outboard plate 48a with inboard plate 48b, is moved in a horizontal direction, depending on the direction of pivoting. Further, as outboard plate 48a pivots about pin 52, outboard plate 48a is moved vertically, depending on the direction of pivoting. In this exemplary manner, it is possible to adjust the position of outboard plate 48a relative to end plate 36 of mounting fixture 28, and thus, adjust the position of machine bearing 47 relative to cylinder block 12.

Each of exemplary plates 48a and 48b defines a bore 54 for receiving boring bar 24 and measuring bar 32. Bores 54 of respective outboard plates 48a each receive a respective machine bearing 47, such that machine bearings 47 are located at opposite ends of mounting fixture 28 and cylinder block 12. The two pairs of plates 48a and 48b are configured to be moved with respect to respective pins 50 and 52, such that machine bearings 47 define an axis, such that when boring bar 24 is received in machine bearings 47, the longitudinal axis of boring bar 24 is aligned with (e.g., co-axial with) an axis defined by centers of longitudinally-spaced surfaces 10 and/or 14.

The pairs of plates 48a and 48b at both ends of alignment assembly 30 may be configured and assembled in a similar manner. Thus, the two machine bearings 47, each of which is received in a bore 54 of outboard plates 48a at opposite ends of alignment assembly 30, can be positioned by movement of outboard plates 48a and/or inboard plates 48b of each of the pairs of plates 48a and 48b, in particular, in the lateral direction and the vertical direction. As a result, the locations of machine bearings 47 can be positioned, such that when boring bar 24 is received in machine bearings 47, the longitudinal axis of boring bar 24 is aligned with (e.g., co-axial with) the axis defined by the centers of longitudinally-spaced surfaces 10 and/or 14.

In order to move plates 48a and 48b in a controlled manner, exemplary alignment assembly 30 includes adjustment screws 56a and 56b. Exemplary adjustment screws 56a and 56b may take the form of, for example, micrometer handles, such that adjustment screws 56a and 56b may be capable of facilitating adjustment increments on the order of, for example, as little as one-ten-millionth of an inch.

As shown in FIG. 5, a bracket 57 associated with exemplary outboard plate 48a is configured to receive adjustment screw 56a and extend at least partially over an upper surface of adjacent exemplary inboard plate 48b. Thus, adjustment screw 56a is coupled to outboard plate 48a and is configured to abut the upper surface of inboard plate 48b, such that extension and retraction of adjustment screw 56a relative to bracket 57 results in pivoting outboard plate 48a with respect to inboard plate 48b. Exemplary adjustment screw 56b extends through main frame 20 adjacent a side portion of inboard plate 48b, such that extension and retraction of adjustment screw 56b results in pivoting outboard plate 48b with respect to end plate 36 of mounting fixture 28. Thus, adjustment screw 56a is configured to pivot outboard plate 48a about pin 52, thereby moving bore 54 and machine bearing 47 in a vertical direction. Adjustment screw 56b is configured to pivot inboard plate 48b about pin 50, thereby moving bore 54 and machine bearing 47 in a lateral direction.

Figure 9:
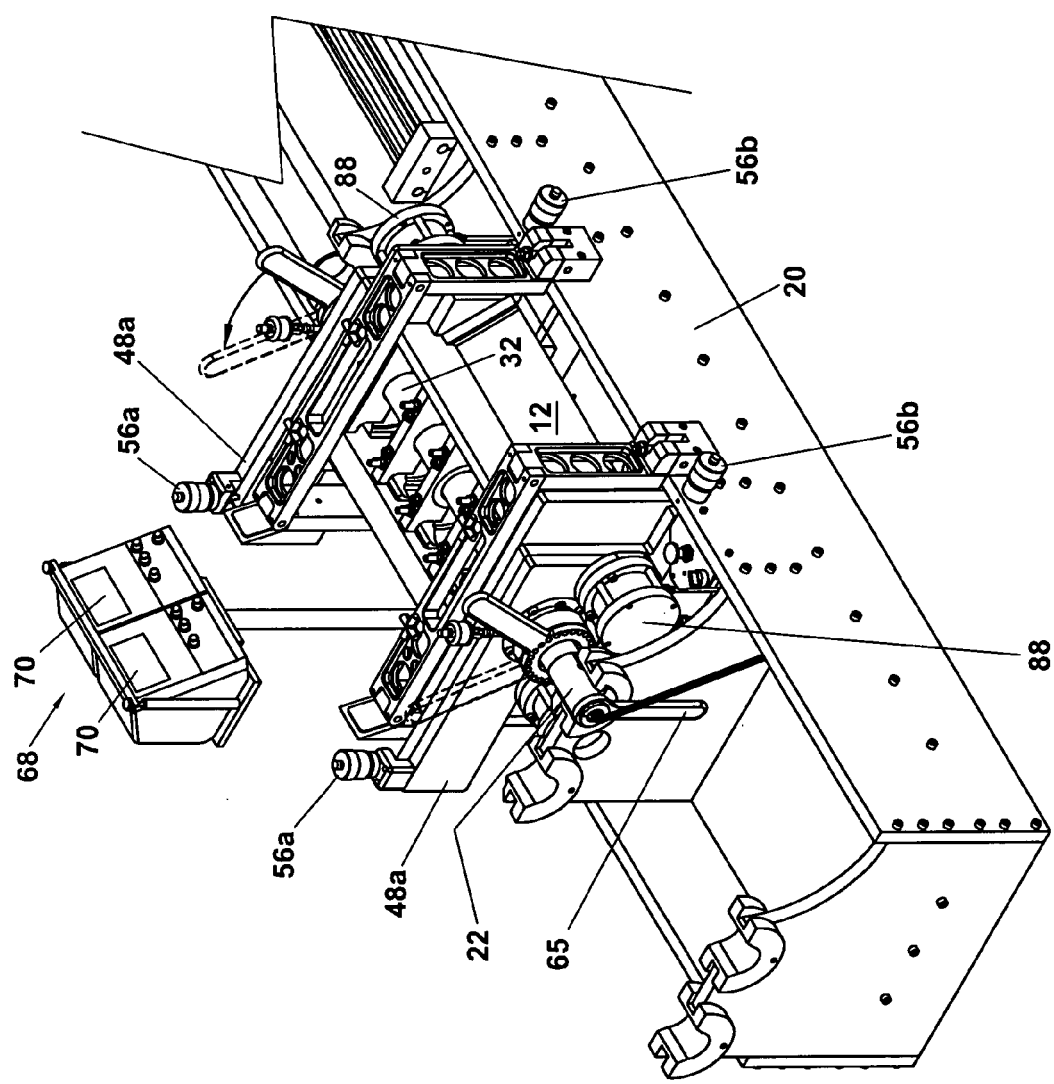
FIG. 9 is a schematic partial view of the exemplary embodiment shown in FIG. 2.

In order to facilitate positioning of machine bearings 47 such that when boring bar 24 is received in machine bearings 47, the longitudinal axis of boring bar 24 is aligned with the axis defined by the centers of longitudinally-spaced surfaces 10 and/or 14, exemplary alignment bar 32 may be used. For example, alignment bar 32 may be positioned in machine bearings 47 (see FIGS. 2, 4, and 9) following the mounting of cylinder block 12 in mounting fixture 28. Alignment bar 32 extends between machine bearings 47 and defines an outer diameter configured to be tightly received in machine bearings 47. Further, the outer diameter defined by alignment bar 32 is configured to be substantially equal to the outer diameter of boring bar 24. Thus, by positioning plates 48a and 48b such that the longitudinal axis of alignment bar 32 is aligned with the axis defined by the centers of the longitudinally-spaced surfaces 10 and/or 14 to be machined, boring bar 24 will also be aligned with the axis, once alignment bar 32 has been replaced in machine bearings 47 with boring bar 24, as explained in more detail herein.

Referring to FIGS. 10A and 10B, in order to position plates 48a and 48b, such that the alignment bar 32 is aligned with the axis of longitudinally-spaced surfaces 10 and/or 14 being machined, exemplary alignment bar 32 includes two transducers 60a and 60b (e.g., reciprocating transducers) that effectively measure the distance between the longitudinal axis of alignment bar 32 and surfaces 10 and/or 14 at two positions along the length of alignment bar 32. For example, as shown in FIGS. 10A and 10B, exemplary alignment bar 32 includes a shaft 63 that is at least partially hollow and thus defines at least one internal cavity 64 for receiving the two transducers 60a and 60b. Exemplary transducers 60a and 60b include a reciprocating portion 62 that is configured to extend though an aperture 66 in alignment bar 32. Apertures 66 and transducers 60a and 60b are spaced from one another along the length of alignment bar 32, such that when alignment bar 32 is inserted into machine bearings 47 located at opposite ends of mounting fixture 28, reciprocating portions 62 of transducers 60a and 60b are aligned with longitudinally-spaced surfaces 10 and/or 14. Alignment bar 32 is thus positioned such that it extends through machine bearings 47, as well as surfaces 10 and/or 14, in a similar manner that the boring bar 24 will be positioned during machining of longitudinally-spaced surfaces 10 and/or 14. According to some embodiments, shaft 63 and/or one or more of transducers 60a and 60b may be configured, such that the distance between transducers 60a and 60b may be changed, for example, to accommodate different parts (e.g., different cylinder blocks) having a different longitudinal separation between the surfaces to be machined.

In the exemplary embodiment shown in FIGS. 10A and 10B and FIG. 2, once alignment bar 32 is positioned in machine bearings 47, reciprocating portions 62 of transducers 60a and 60b are positioned such that the tips of portions 62 follow along surfaces 10 and/or 14 of cylinder block 12 as alignment bar 32 is rotated in machine bearings 47. Exemplary alignment bar 32 includes a handle 65 to facilitate rotation of alignment bar 32 in machine bearings 47. As the tips travel along surfaces 10 and/or 14, they generate signals indicative of the distance between the longitudinal axis of alignment bar 32 and surfaces 10 and/or 14. As a result, when transducers 60a and 60b indicate that the distance between the axis of alignment bar 32 and surfaces 10 and/or 14 does not change as alignment bar 32 is rotated in machine bearings 47, it indicates that the axis of alignment bar 32 is aligned with the axis defined by the centers of the longitudinally-spaced surfaces 10 and/or 14.

In order to align alignment bar 32 with respect to the axis of defined by the centers of surfaces 10 and/or 14, the position of plates 48a and 48b is adjusted using exemplary adjustment screws 56a and 56b respectively associated with plates 48a and 48b. Plates 48a and 48b are adjusted until transducers 60a and 60b of alignment bar 32 indicate that the axis of alignment bar 32 is aligned (and thus co-axial) with the axis defined by the centers of the longitudinally-spaced surfaces 10 and/or 14 to be machined.

Figure 4:
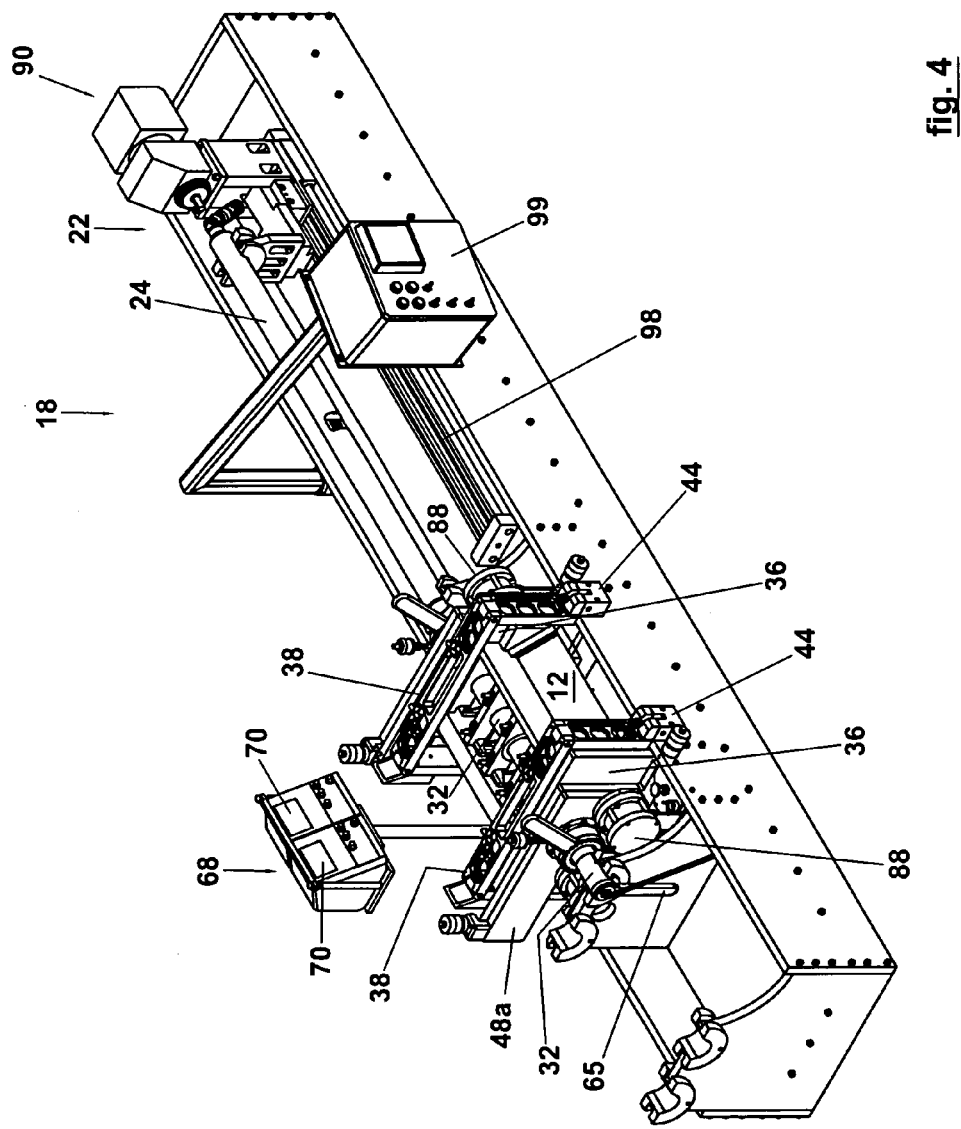
FIG. 4 is a schematic perspective view of the exemplary embodiment shown in FIG. 2 shown in a second mode.
Figure 11:
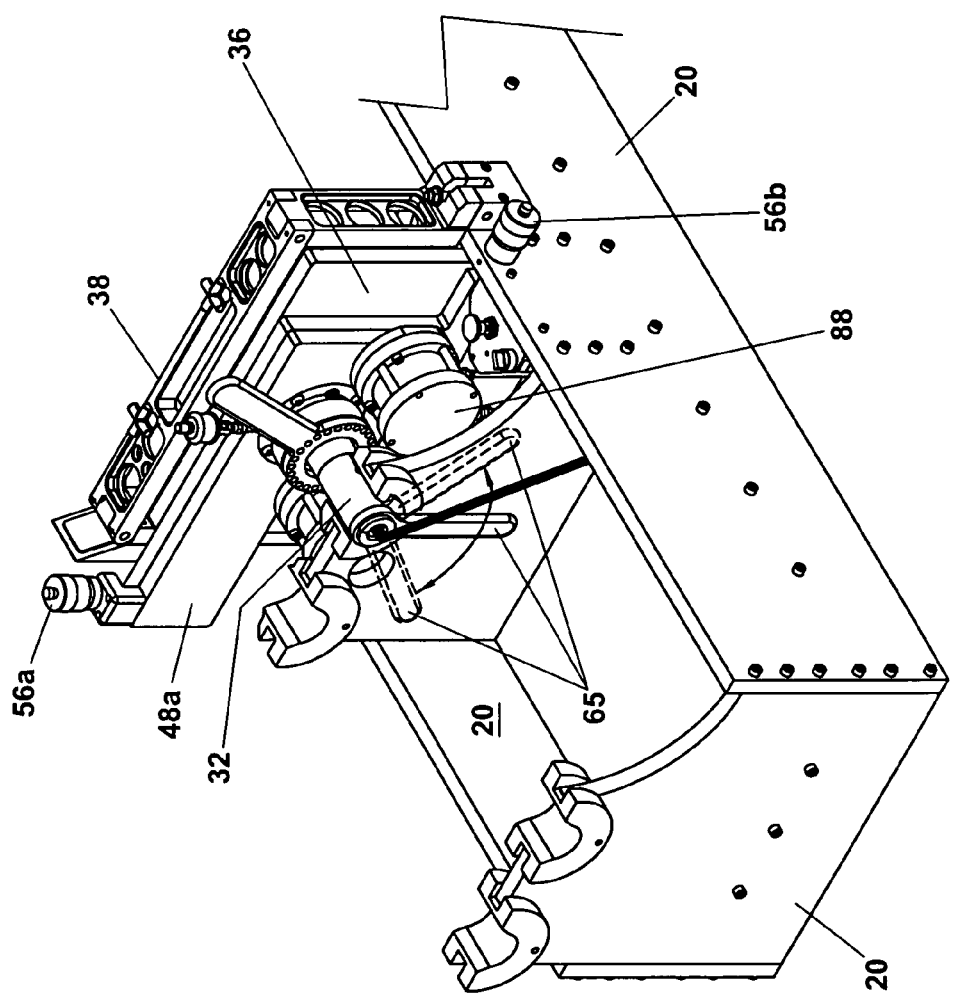
FIG. 11 is a schematic partial view of the exemplary embodiment shown in FIG. 2.
Figure 14:
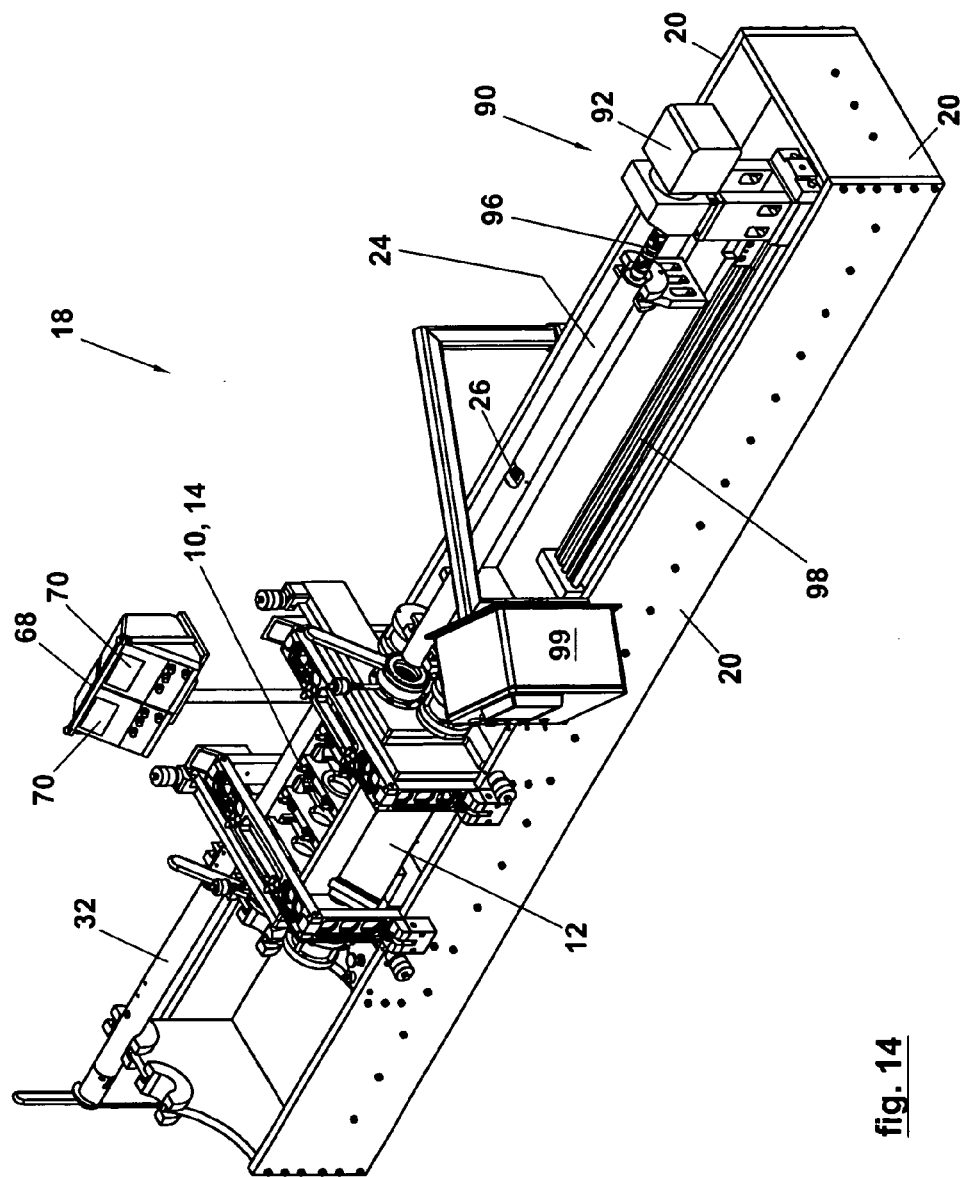
FIG. 14 is a schematic perspective reverse view of the exemplary embodiment shown in FIG. 2 shown in a third mode.

In order to facilitate reading of the signals of transducers 60a and 60b, an operator interface 68, including, for example, a pair of indicators 70 (e.g., digital and/or analog meters), each associated with a respective one of transducers 60a and 60b, may be provided, for example, as shown in FIGS. 2, 4, and 14. Transducer(s) 60a and/or 60b may be configured to communicate with interface 68 via at least one wire and/or via wireless link. Thus, when aligning alignment bar 32 with the axis of the surfaces 10 and/or 14 to be machined, the operator may rotate alignment bar 32 (e.g., via handle 65) (see FIG. 11) and observe the indicator readings as alignment bar 32 is rotated. Based on the magnitude of change of the indicator readings as alignment bar 32 is rotated, the operator adjusts adjustment screws 56a and 56b associated with plates 48a and 48b to move the location of machine bearings 47 relative to cylinder block 12, which is fixedly secured in mounting fixture 28. When the magnitude of change of the indicator readings as alignment bar is rotated 32 approaches a minimum or zero, it is an indication that the axis of alignment bar 32 is aligned and co-axial with the axis of the centers of the longitudinally-spaced surfaces 10 and/or 14 to be machined.

Once alignment bar 32 has been aligned, exemplary machine bearings 47 may be fixed in a position corresponding to the aligned position. To facilitate this, plates 48a and/or 48b may be fixed into a position corresponding to the aligned position.

According to the exemplary embodiment shown, machine bearings 47 have a configuration that may be adjusted and fixed when the alignment is achieved. Referring to FIGS. 12A-12G, machine bearings 47 include a housing 72, a cup 74, and a seat member 76. Exemplary housing 72 is configured to be received in bore 54 of outboard plate 48a. In the exemplary embodiment shown, housing 72 includes external threads, and cup 74 includes internal threads, such that housing 72 threads into cup 74. Housing 72 defines a bore for receiving a bearing pack 78, including a plurality of slices 80 of bearing material, which, in turn, collectively define a bore having a common diameter and an axis. Slices 80 of bearing pack 78 have an external diameter slightly smaller than the diameter defined by the bore of housing 72, such that slices 80 may move radially within the bore of housing 72, unless they are locked into position. By virtue of this sliding capability, the centers of slices 80 may move to a position off-center with respect to housing 72's bore. This enables machine bearings 47 to securely hold alignment bar 32 and boring bar 24 in the aligned position once the aligned position has been identified and fixed.

Referring to FIGS. 12C-12G, exemplary machine bearings 47 further include a biasing member 81 (e.g., a rubber pin) located in, for example, a lower portion of housing 72 between the lower portion of housing 72's bore and bearing pack 78. For example, the outer diameter of slices 80 and the inner diameter of housing 72 define first respective complimentary recesses 83a and 83b, which are configured to receive biasing member 81. In the exemplary embodiment shown, the resilient material of biasing member 81 serves to bias the position of slices 80 of bearing pack 78 toward the upper portion of housing 72. Further, the outer diameter of slices 80 and the inner diameter of housing 72 define second respective complimentary recesses 85a and 85b, which are configured to receive a pin 87 so that each of slices 80 maintains circumferential alignment with respect to one another and housing 72. Slices 80 may also define a clearance slot 89 (see FIGS. 12A and 12C-12F) configured to provide transducer 60a and/or 60b and cutting tool 26 with clearance for insertion and removal from machine bearings 47 without necessarily repositioning cutting tool 26 and/or machine bearings 47.

Figure 12C:
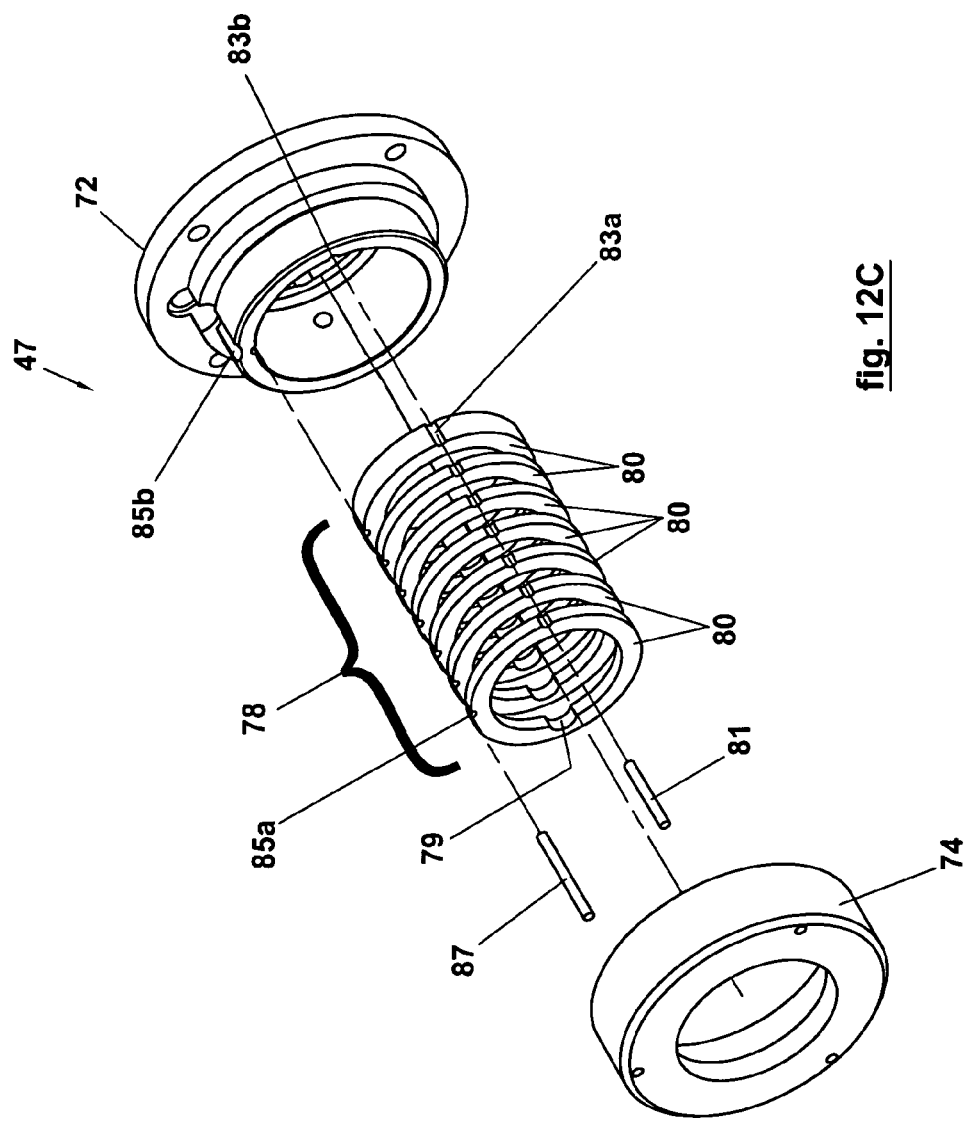
FIG. 12C is a schematic exploded view of a portion of the exemplary embodiment shown in FIG. 12A.
Figure 12E:
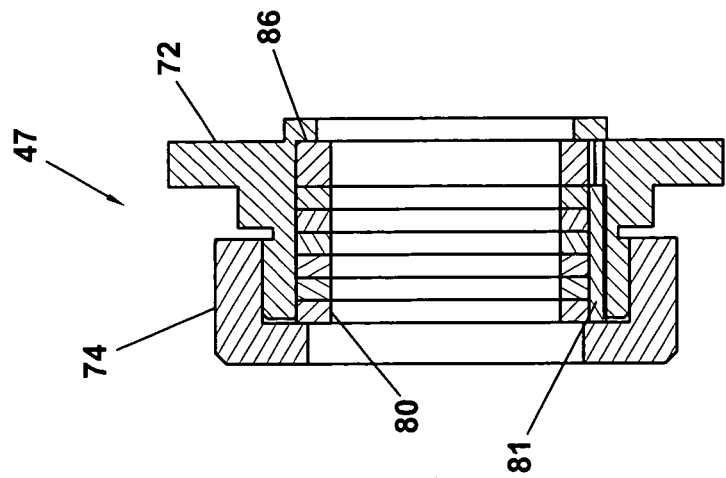
FIG. 12E is a schematic section view of the exemplary embodiment shown in FIG. 12D along line E-E.
Figure 12D:
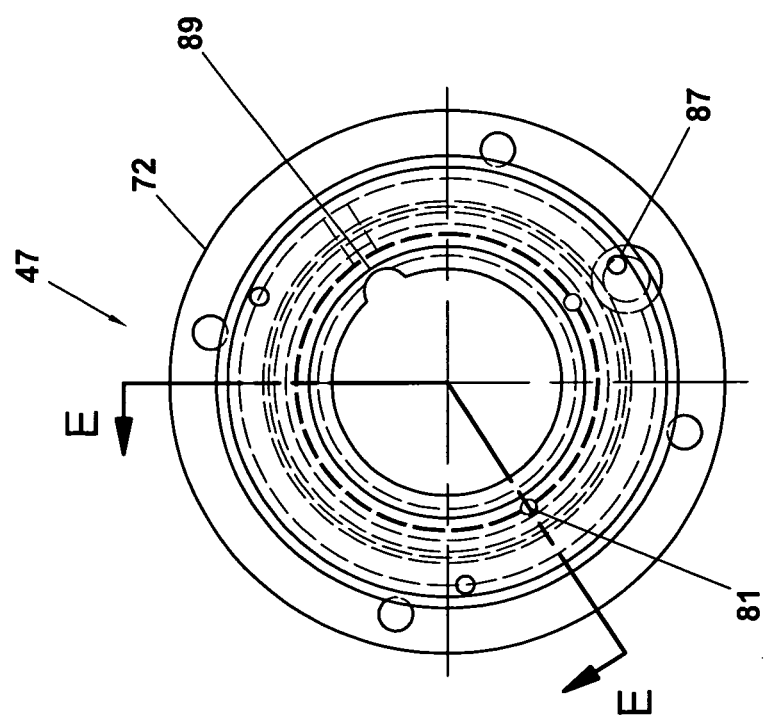
FIG. 12D is a schematic front view of the exemplary embodiment shown in FIG. 12A.
Figure 12G:
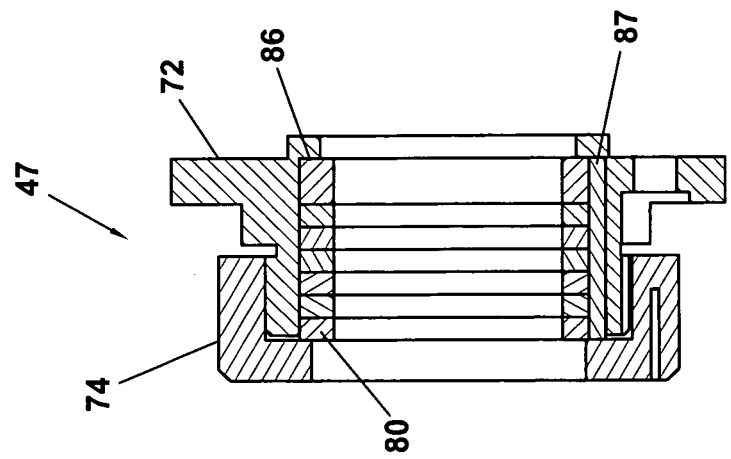
FIG. 12G is a schematic section view of the exemplary embodiment shown in FIG. 12F along line G-G.
Figure 12F:
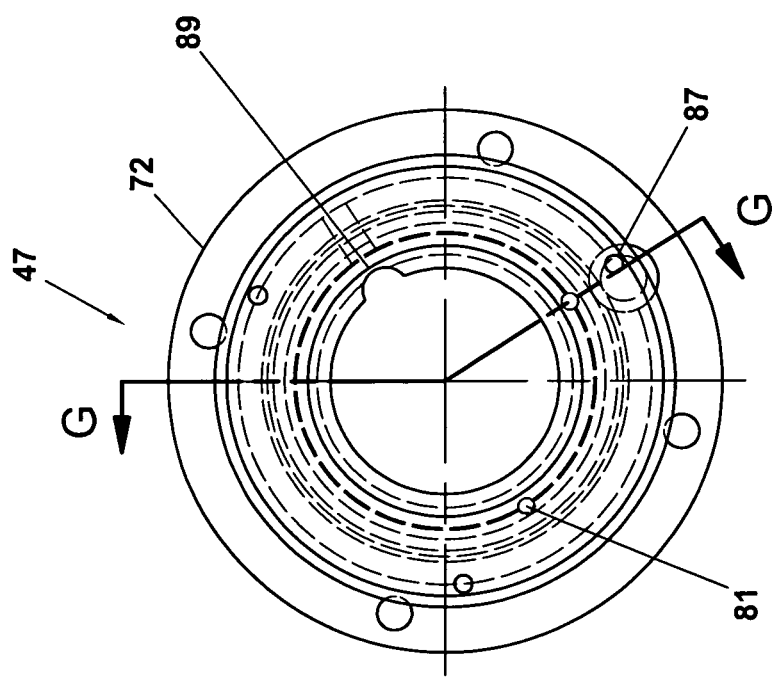
FIG. 12F is a schematic front view of the exemplary embodiment shown in FIG. 12A.

Exemplary machine bearings 47 also include a handle 84 (FIG. 12A) associated with housing 72, and housing 72 defines a shoulder 86 retaining bearing pack 78 between housing 72 and the bottom of cup 74 (FIGS. 12B, 12E, and 12G). Once machine bearings 47 are positioned such that alignment bar 32 has been aligned with respect to the axis of the longitudinally-spaced surfaces 10 and/or 14, housing 72 may be screwed tightly into cup 74 using handle 84, thereby squeezing slices 80 of bearing pack 78 together between shoulder 86 of housing 72 and the bottom of cup 74, such that slices 80 maintain their respective radial positions within the housing 72 upon removal of alignment bar 32. In this manner, bearing slices 80 maintain the aligned position upon removal of alignment bar 32, so that boring bar 24 will be aligned with the axis of surfaces 10 and 14 upon insertion into machine bearings 47. Alternatively, the aligned position of bearing slices 80 may be maintained, for example, by sandwiching bearing slices 80 between two opposing plates (not shown) via, for example, one or more pneumatic cylinders, one or more hydraulic cylinders, and/or via compression provided by one or more bolts (e.g., between four bolts) extending between the opposing plates.

In order to hold plates 48a and 48b in a position that results in the axis of alignment bar 32 being aligned with the axis of the longitudinally-spaced surfaces 10 and/or 14 to be machined, exemplary machine 18 includes a clamping device 88 associated with each end of alignment assembly 30 (see FIGS. 2, 4, 9, and 11). Clamping device 88 may be at least one of an air cylinder, hydraulic cylinder, and a manual clamp, or any other suitable device for clamping plates together. For example, exemplary clamping device 88 shown includes a stud 91 (FIGS. 6-8) that extends through substantially aligned oversize bores 93 in each of plates 48a and 48b and mounts to end plate 36 of mounting fixture 28. Upon actuation, clamping devices 88 tightly clamp each of the pairs of plates 48a and 48b and a respective end plate 36 to one another. This results in fixing plates 48a and 48b and respective machine bearings 47 in the locations that result in the axis of alignment bar 32 being aligned with the axis of the longitudinally-spaced surfaces 10 and/or 14 to be machined.

Figure 13:
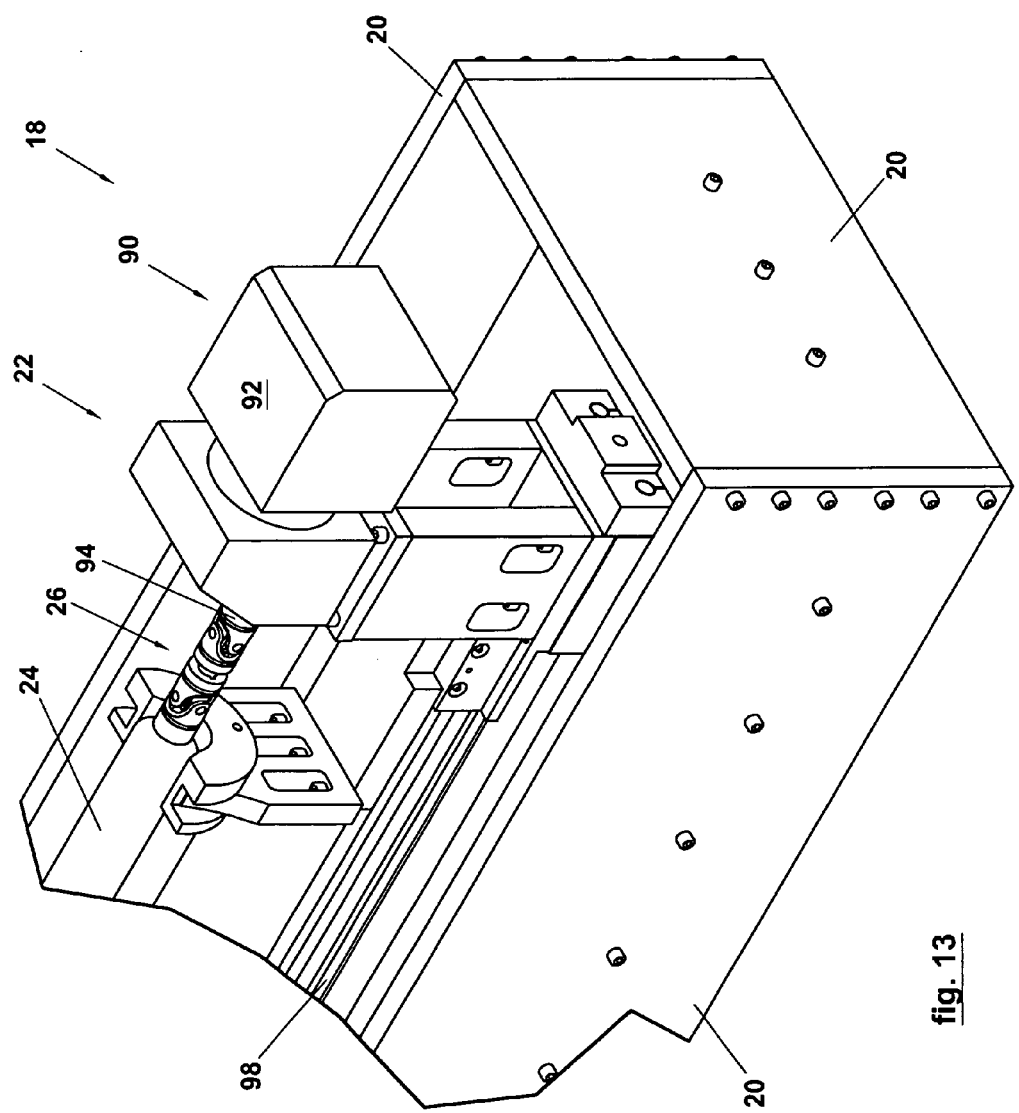
FIG. 13 is a schematic partial perspective view of the exemplary embodiment shown in FIG. 2.
Figure 16:
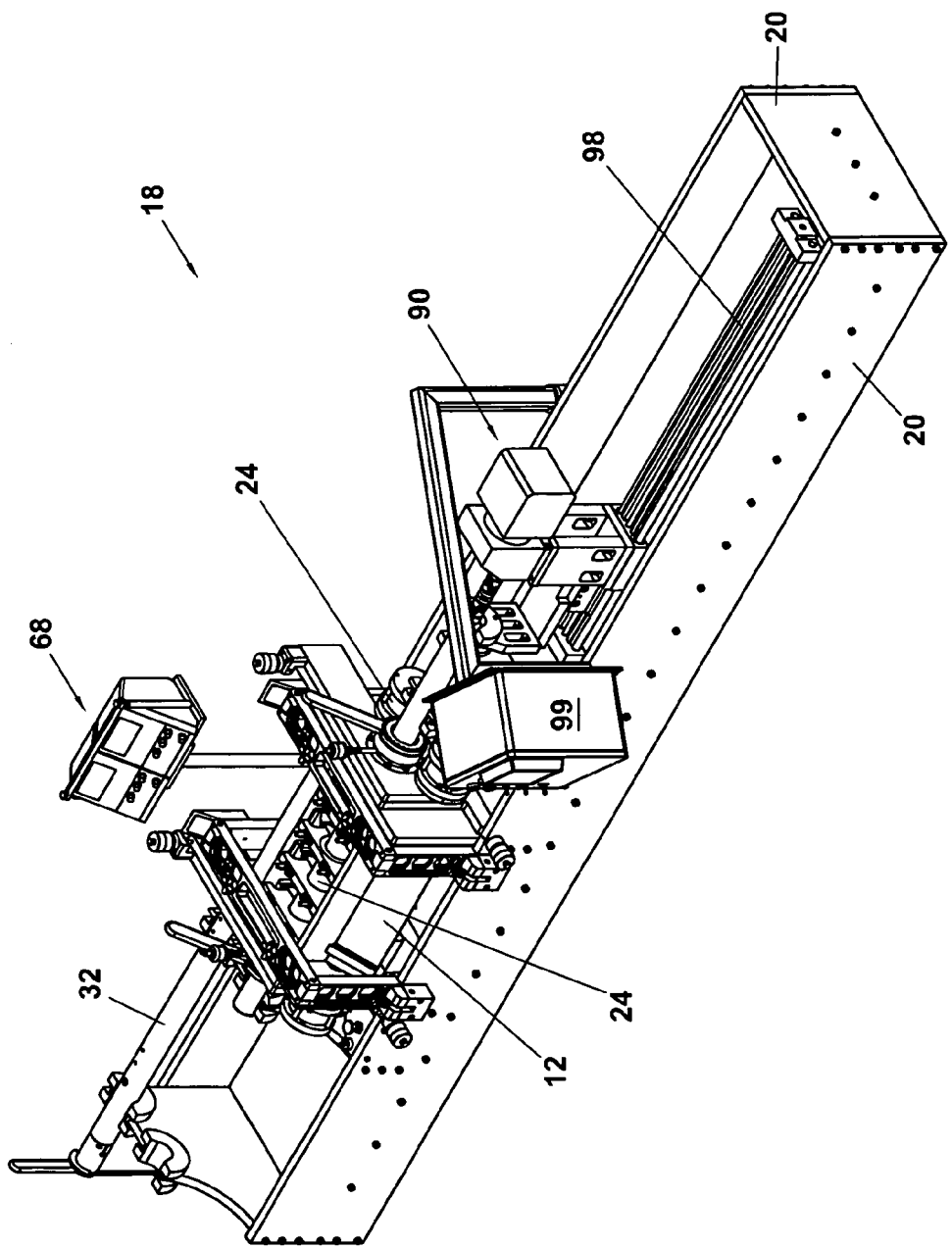
FIG. 16 is a schematic perspective reverse view of the exemplary embodiment shown in FIG. 2 shown in a fourth mode.

Once machine bearings 47 have been moved into the aligned position and locked in place by clamping devices 88, alignment bar 32 may be removed from machine bearings 47 (see FIG. 14), so that boring bar 24 can be extended into machine bearings 47 and positioned for machining surfaces 10 and/or 14 (FIG. 16). Referring to FIG. 13, boring apparatus 22 includes a drive assembly 90, including a drive motor 92 for driving boring bar 24 in a rotational manner. Boring bar 24 is coupled to a drive shaft 94 of drive motor 92 via a flexible coupling 96 configured to permit boring bar 24 to rotate in a smooth manner even when the axis of boring bar 24 is slightly misaligned with respect to the axis of drive shaft 94. This permits boring bar 24 to rotate on an axis aligned with (e.g., co-axial with) the axis of the longitudinally-spaced surfaces 10 and/or 14 being machined while still being driven by drive shaft 94.

Exemplary drive assembly 90 is mounted on a set of rails 98 (e.g., precision rails) and is configured to travel down rails 98 toward a distal end of main frame 20 such that boring bar 24 is positioned for machining surfaces 10 and/or 14. Exemplary boring apparatus 22 may include a travel motor for moving drive assembly 90 on rails 98. Further, boring apparatus 22 may include a control interface 99 (e.g., including a programmable controller) (see FIG. 14) configured to control the drive speed of the travel motor, and/or to control operation of the travel motor to control the feed rate of the machining of surfaces 10 and/or 14, such that machined surfaces 10 and/or 14 have the desired surface finish (i.e., a relatively smooth surface finish associated with slower feed rates, or a relatively rough surface finish associated with faster feed rates).

Figure 15:
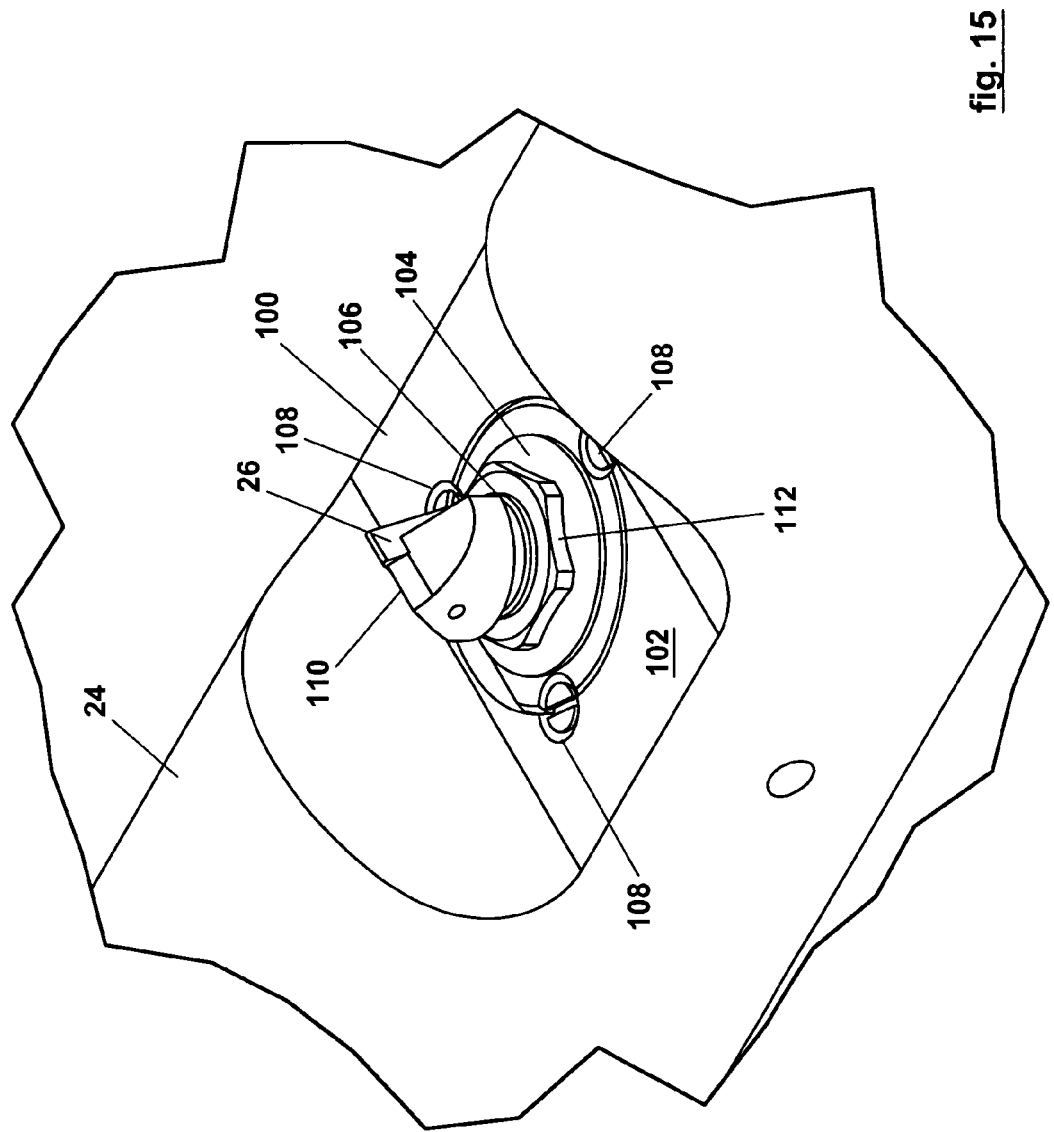
FIG. 15 is schematic partial perspective view of a portion of the exemplary embodiment shown in FIG. 2.

As mentioned previously herein, exemplary boring bar 24 has substantially the same outer diameter as alignment bar 32 and fits tightly into machine bearings 47 located at either end of mounting fixture 28. Referring to FIG. 15, exemplary boring bar 24 defines a recess 100 in the outer diameter configured to receive cutting tool 26, and the bottom of recess 100 defines a bore for receiving a cutting tool housing 104, which, in turn, defines a threaded bore for receiving a threaded stud-portion 106 of cutting tool 26. The bore in boring bar 24 and cutting tool housing 104 collectively define threaded bores for receiving screws 108 configured to prevent cutting tool housing 104 from moving with respect to the bore that receives cutting tool housing 104.

In the exemplary embodiment shown in FIG. 15, cutting tool housing 104 and cutting tool 26 are configured such that the tip 110 of cutting tool 26 extends beyond the outer diameter of boring bar 24. Thus, as boring bar 24 rotates within surfaces 10 and/or 14 being machined, cutting tool 26 removes material from surfaces 10 and/or 14. Cutting tool housing 104 and stud-portion 106 of cutting tool 26 permit adjustment of the effective cutting diameter of the machining. In particular, the effective diameter can be reduced (i.e., resulting in relatively less material being removed during a machining pass) by screwing cutting tool 26 farther into cutting tool housing 104, and conversely, the effective diameter can be increased (i.e., resulting in relatively more material being removed during a machining pass) by unscrewing cutting tool 26 with respect to cutting tool housing 104. A lock nut 112 may be used to hold cutting tool 26 in the desired position with respect to cutting tool housing 104.

During operation, the operator activates the travel motor, thereby moving drive assembly 90 down rails 98, such that cutting tool 26 on boring bar 24 passes through cylinder block 12 and beyond surfaces 10 and/or 14 located remote from drive assembly 90 (see FIGS. 14 and 16). As mentioned previously herein, machine bearings 47 define clearance slot 89 for providing clearance for reciprocating portions 62 of alignment bar transducers 60*a* and/or 60*b*. Clearance slot 89 also provides clearance for cutting tool 26 as it is moved into and out of position for machining surfaces 10 and/or 14. Once cutting tool 26 is moved into position to begin cutting, drive motor 92 is activated such that boring bar 24 rotates, and the travel motor is activated such that drive assembly 90 is moved back toward the proximate end of main frame 20. Once boring bar 24 has advanced toward the proximate end of main frame 20 a sufficient amount to complete a machining pass of surfaces 10 and/or 14, travel motor and drive motor 92 may be stopped. If additional machining passes are desired, the travel motor may be activated to reposition cutting tool 26 on the remote side of cylinder block 12, the effective diameter of cutting tool 26 may be adjusted as desired, and another machining pass may be commenced.

Once surfaces 10 and/or 14 have been machined to the desired dimension and/or surface finish, the travel motor may be used to withdraw boring bar 24 from cylinder block 12. Hold-down clamps 38 may be disengaged, cylinder block 12 may be disengaged from end plates 36 and support tray 34, and cylinder block 12 may be removed from machine 18 via, for example, a hoist.

The above-outlined process may be repeated for another part. For example, a different cylinder block may be mounted to mounting fixture 28, and the exemplary process may be repeated for the different cylinder block; either a cylinder block having a similar (e.g., the same) structure as the cylinder block previously machined, or a cylinder block having a different structure. According to some embodiments, machine 18 may be configured such that if the cylinder block has the same structure as the previously-machined cylinder block, it may not be necessary to re-position plates 48*a* and 48*b* in order to position machine bearings 47 such that the axis of boring bar 24 will be aligned with the axis of the centers of the longitudinally-spaced surfaces being machined in the newly-mounted cylinder block. Alternatively, the plates 48*a* and 48*b* my require very little re-positioning in order to position machine bearings 47 such that the axis of boring bar 24 will be aligned with the axis of the centers of the longitudinally-spaced surfaces being machined in the newly-mounted cylinder block. This may serve to reduce the amount of time associated with machining a number of cylinder blocks.

At least some portions of exemplary embodiments of the systems outlined above may used in association with portions of other exemplary embodiments. Moreover, at least some of the exemplary embodiments disclosed herein may be used independently from one another and/or in combination with one another and may have applications to devices and methods not disclosed herein. For example, although the exemplary structures and processes described in association with exemplary machine 18 have been described in relation to machining the cylinder block of an internal combustion engine, it is contemplated that those exemplary structures and processes may be used to machine parts having other configurations and/or end uses.

It will be apparent to those skilled in the art that various modifications and variations can be made to the structures and methodologies described herein. Thus, it should be understood that the invention is not limited to the subject matter discussed in the description. Rather, the present invention is intended to cover modifications and variations.

What is claimed is:

1. A machine for boring axially-aligned surfaces of a part, wherein the axially-aligned surfaces are spaced from one another, the machine comprising:

a frame;

a boring apparatus associated with the frame, the boring apparatus being configured to bore at least one surface of the part, the boring apparatus comprising a boring bar associated with a cutting tool configured to rotate about a longitudinal axis of the boring bar;

a mounting fixture associated with the frame, the mounting fixture being configured to mount the part in a fixed relationship with respect to the frame; and an alignment assembly movably associated with the frame, the alignment assembly being configured to support the boring bar such that the longitudinal axis of the boring bar is aligned with an axis defined by the axially-aligned surfaces of the part, wherein the alignment assembly comprises at least one pair of plates, at least one of the plates of the pair of plates being configured to pivot such that the longitudinal axis of the boring bar is aligned with the axis defined by the axially-aligned surfaces of the part, wherein each of the plates of the at least one pair of plates is configured to pivot about a separate respective axis, and wherein first and second plates of the at least one pair of plates define respective first and second bores configured to receive the boring bar.

2. The machine of claim 1, wherein the alignment assembly comprises two pairs of plates.

3. A machine for boring axially-aligned surfaces of a part, wherein the axially-aligned surfaces are spaced from one another, the machine comprising:

a frame;

a boring apparatus associated with the frame, the boring apparatus being configured to bore at least one surface of the part, the boring apparatus comprising a boring bar associated with a cutting tool configured to rotate about a longitudinal axis of the boring bar;

a mounting fixture associated with the frame, the mounting fixture being configured to mount the part in a fixed relationship with respect to the frame;

an alignment assembly movably associated with the frame, the alignment assembly comprising at least two spaced supports configured to rotatably support the boring bar such that the longitudinal axis of the boring bar is aligned with an axis defined by the axially-aligned surfaces of the part; and at least one indicator configured to provide an output indicative of a degree of alignment between the longitudinal axis defined by the boring bar and the axis defined by the axially-aligned surfaces of the part, wherein at least one of the spaced supports comprises first and second plates configured to pivot about respective first and second axes such that the longitudinal axis of the boring bar is aligned with the axis defined by the axially-aligned surfaces of the part.

4. The machine of claim 3, wherein the at least one indicator comprises first and second indicators associated respectively with first and second supports of the at least two spaced supports.

5. The machine of claim 1, wherein the first plate is configured to pivot such that the first respective bore moves along a first tangent line, and the second plate is configured to pivot such that the second respective bore moves along a second tangent line that is substantially perpendicular with respect to the first tangent line.

6. The machine of claim 1, wherein one of the first and second bores is configured to receive a bearing configured to rotatably support the boring bar.

7. The machine of claim 1, wherein the first and second plates of the at least one pair of plates are associated with one another such that a surface of the first plate and a surface of the second plate contact one another.

8. The machine of claim 7, wherein the first and second plates are configured to slide with respect to one another.

9. The machine of claim 1, wherein the machine further comprises at least one clamping device configured to hold the at least one pair of plates in a position such that the longitudinal axis of the boring bar is aligned with the axis defined by the axially-aligned surfaces of the part.

10. The machine of claim 9, wherein the at least one clamping device comprises at least one of an air cylinder, a hydraulic cylinder, and a manual clamp associated with the frame of the machine.

11. The machine of claim 1, wherein the alignment assembly further comprises at least one adjustment screw configured to move at least one of the plates such that the longitudinal axis of the boring bar is aligned with the axis defined by the axially-aligned surfaces of the part.

12. The machine of claim 1, further comprising at least one bearing received in one of the first and second bores defined by the respective first and second plates of the at least one pair of plates, the bearing being configured to rotatably support the boring bar and provide an adjustable support surface defining an axis configured to be aligned with the longitudinal axis of the boring bar.

13. The machine of claim 12, wherein the at least one bearing defines a clearance configured to permit the boring bar and the cutting tool to pass through the at least one bearing.

14. The machine of claim 1, wherein the machine further comprises at least one indicator configured to provide an output indicative of a degree of alignment between the longitudinal axis of the boring bar and the axis defined by the axially-aligned surfaces of the part.

15. A machine for boring axially-aligned surfaces of a part, wherein the axially-aligned surfaces are spaced from one another, the machine comprising:

a frame;

a boring apparatus associated with the frame, the boring apparatus being configured to bore at least one surface of the part, the boring apparatus comprising a boring bar associated with a cutting tool configured to rotate about a longitudinal axis of the boring bar;

a mounting fixture associated with the frame, the mounting fixture being configured to mount the part in a fixed relationship with respect to the frame; and an alignment assembly moveably associated with the frame, the alignment assembly being configured to support the boring bar such that the longitudinal axis of the boring bar is aligned with an axis defined by the axially-aligned surfaces of the part, wherein the alignment assembly comprises
at least one pair of plates, and
at least one adjustment screw configured to move at least one of the plates such that the longitudinal axis of the boring bar is aligned with an axis defined by the axially-aligned surfaces of the part, and
wherein at least one of the pair of plates is configured to pivot about an axis such that the longitudinal axis of the boring bar is aligned with the axis defined by the axially-aligned surfaces of the part.

16. The machine of claim 15, wherein the adjustment screw is configured to provide adjustment in increments as small as about one ten-millionth of an inch.

17. The machine of claim 15, wherein first and second plates of the at least one pair of plates define respective first and second bores, and wherein the first plate is configured to pivot about a first axis such that the first bore moves along a first tangent line, and the second plate is configured to pivot about a second axis such that the second bore moves along a second tangent line.

18. The machine of claim 17, wherein the first tangent line and the second tangent line are substantially perpendicular with respect to one another.

19. The machine of claim 17, wherein the at least one adjustment screw comprises a first adjustment screw configured to move the first bore along the first tangent line, and a second adjustment screw configured to move the second bore along the second tangent line.

20. The machine of claim 17, further comprising a bearing received in one of the first and second bores, the bearing being configured to rotatably support the boring bar.

21. The machine of claim 20, wherein the bearing defines a clearance configured to permit the boring bar and the cutting tool to pass through the bearing.

22. The machine of claim 15, wherein first and second plates of the at least one pair of plates are associated with one another such that a surface of the first plate and a surface of the second plate contact one another.

23. The machine of claim 22, wherein the first and second plates are configured to slide with respect to one another.

24. The machine of claim 15, further comprising at least one clamping device configured to hold the at least one pair of plates in a position such that the longitudinal axis of the boring bar is aligned with the axis defined by the axially-aligned surfaces of the part.

25. The machine of claim 24, wherein the at least one clamping device comprises at least one of an air cylinder, a hydraulic cylinder, and a manual clamp associated with the frame of the machine.

26. The machine of claim 3, wherein the at least two spaced supports comprise first and second supports, wherein the first and second supports define respective first and second bores configured to receive the boring bar such that the boring bar is rotatably supported in the first and second bores.

27. The machine of claim 15, further comprising at least one bearing received in one of the first and second bores defined by respective first and second plates of the at least one pair of plates, the bearing being configured to rotatably support the boring bar and provide an adjustable support surface defining an axis configured to be aligned with the longitudinal axis of the boring bar.

28. The machine of claim 15, wherein first and second plates of the at least one pair of plates define respective first and second bores configured to receive the boring bar, and wherein the machine further comprises at least one indicator configured to provide an output indicative of a degree of alignment between the longitudinal axis of the boring bar and the axis defined by the axially-aligned surfaces of the part.

29. A machine for boring axially-aligned surfaces of a part, wherein the axially-aligned surfaces are spaced from one another, the machine comprising:
a frame;
a boring apparatus associated with the frame, the boring apparatus being configured to bore at least one surface of the part, the boring apparatus comprising a boring bar associated with a cutting tool configured to rotate about a longitudinal axis of the boring bar;
a mounting fixture associated with the frame, the mounting fixture being configured to mount the part in a fixed relationship with respect to the frame;
an alignment assembly movably associated with the frame, the alignment assembly comprising at least two spaced supports configured to support the boring bar such that the longitudinal axis of the boring bar is aligned with an axis defined by the axially-aligned surfaces of the part,
wherein the alignment assembly further includes a bearing received by each of the supports, the bearings being configured to rotatably support the boring bar, and
wherein the bearings are configured to provide an adjustable support surface defining an axis aligned with the longitudinal axis of the boring bar,
wherein at least one of the bearings defines a clearance configured to permit the boring bar and the cutting tool to pass through the at least one bearing.

30. The machine of claim 26, wherein the first and second supports are configured to be moved independently of one another such that the longitudinal axis of the boring bar is aligned with the axis defined by the axially-aligned surfaces of the part.

31. The machine of claim 29, wherein at least one of the bearings comprises
a housing received in the support, the housing defining an inner bore,
a plurality of bearing slices received in the inner bore of the housing, and
a cup associated with the housing such that the bearing slices are retained within the inner bore.

32. The machine of claim 31, wherein the housing and the cup are configured to be coupled to one another such that the bearing slices may be selectively permitted to move radially within the inner bore or locked in position in the inner bore.

33. The machine of claim 32, wherein the inner bore defines an inner diameter and the bearing slices define an outer diameter, and wherein the inner diameter is greater than the outer diameter such that the bearing slices are permitted to move radially within the inner diameter.

34. The machine of claim 31, wherein each of the bearing slices defines an inner bearing slice diameter configured to receive the boring bar.

35. The machine of claim 34, wherein the inner bearing slice diameters define an adjustable surface for rotatably supporting the boring bar such that the longitudinal axis of the boring bar is aligned with the axis defined by the axially-aligned surfaces of the part.

36. The machine of claim 31, wherein the at least one bearing comprises a resilient material between the plurality of bearing slices and the inner bore of the housing, the resilient material being configured to bias the bearing slices against one portion of a diameter defined by the inner bore.

37. The machine of claim 31, wherein at least one of the inner bore and the bearing slices defines a groove, and the other of the bearing and the bearing slices comprises a protrusion configured to engage the groove such that radial movement of the bearing slices and the inner bore of the housing is prevented.

38. The machine of claim 31, wherein at least one of the housing and the cup comprises a handle configured to facilitate clamping of the bearing slices in a radially fixed position in the inner bore of the housing.

39. The machine of claim 38, wherein the housing and the cup are configured to threadedly engage one another, and the handle is configured to facilitate clamping of the bearing slices between the housing and the cup via tightening of the threaded engagement.

40. The machine of claim 29, wherein at least one of the spaced supports comprises first and second plates configured to pivot about respective first and second axes such that the longitudinal axis of the boring bar is aligned with the axis defined by the axially-aligned surfaces of the part.

41. The machine of claim 29, wherein at least one of the spaced supports comprises first and second plates defining respective first and second bores configured to receive the boring bar, and wherein the alignment assembly further comprises at least one adjustment screw configured to move at least one of the plates such that an axis defined by the first and second bores is aligned with the axis defined by the axially-aligned surfaces of the part.

42. The machine of claim 29, wherein at least one of the spaced supports comprises first and second plates defining respective first and second bores configured to receive the boring bar, and wherein the machine further comprises at least one indicator configured to provide an output indicative of a degree of alignment between the longitudinal axis of the boring bar and the axis defined by the axially-aligned surfaces of the part.

43. The machine of claim 31, wherein the bearing slices define the clearance configured to permit the boring bar and the cutting tool to pass through the at least one bearing.

44. The machine of claim 30, further comprising an alignment bar defining an alignment bar longitudinal axis, the alignment bar being configured to provide signals for the at least one indicator indicative of a degree of alignment between the alignment bar longitudinal axis and the axis defined by the axially-aligned surfaces of the part.

45. The machine of claim 44, wherein the alignment bar comprises first and second spaced transducers configured to provide signals indicative of respective distances between the alignment bar longitudinal axis and respective axially-aligned surfaces of the part.

46. The machine of claim 45, wherein the alignment bar is configured to revolve within the first and second bores, and the first and second transducers are configured to send signals indicative of the respective distances between the alignment bar longitudinal axis and the respective axially-aligned surfaces of the part as the alignment bar is revolved within the bores.

47. The machine of claim 3, wherein the first and second plates define respective first and second bores configured to receive the boring bar, and wherein the alignment assembly further comprises at least one adjustment screw configured move at least one of the plates such that the longitudinal axis of the boring bar is aligned with the axis defined by the axially-aligned surfaces of the part.

48. The machine of claim 3, wherein the first and second plates define respective first and second bores configured to receive the boring bar, and wherein the machine further comprises at least one bearing received in one of the first and second bores, the bearing being configured to rotatably support the boring bar and provide an adjustable support surface defining a support surface axis configured to be aligned with the longitudinal axis of the boring bar.

49. The machine of claim 48, wherein the at least one bearing defines a clearance configured to permit the boring bar and the cutting tool to pass through the at least one bearing.

* * * * *

UNITED STATES PATENT AND TRADEMARK OFFICE
CERTIFICATE OF CORRECTION

| | | |
|---|---|---|
| PATENT NO. | : 8,545,138 B2 | Page 1 of 1 |
| APPLICATION NO. | : 12/479370 | |
| DATED | : October 1, 2013 | |
| INVENTOR(S) | : Larry C. Wilkins | |

It is certified that error appears in the above-identified patent and that said Letters Patent is hereby corrected as shown below:

On the title page, item (76) should read as --(75) Inventor: Larry C. Wilkins, Ft. Lauderdale, FL (US)--; and below item (75), please insert the following:

--(73) Assignee: Electromechanical Research Laboratories, Inc., New Albany, IN (US)--.

Signed and Sealed this
Fifteenth Day of July, 2014

Michelle K. Lee
*Deputy Director of the United States Patent and Trademark Office*